(12) United States Patent
Raynel et al.

(10) Patent No.: US 10,946,330 B2
(45) Date of Patent: Mar. 16, 2021

(54) SYSTEM AND METHOD FOR REMOVING ACID GAS FROM A SOUR GAS STREAM

(71) Applicant: Saudi Arabian Oil Company, Dhahran (SA)

(72) Inventors: Guillaume Robert Jean-Francois Raynel, Dhahran (SA); Thibault Tarik Villette, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 386 days.

(21) Appl. No.: 15/889,522

(22) Filed: Feb. 6, 2018

(65) Prior Publication Data

US 2019/0240613 A1    Aug. 8, 2019

(51) Int. Cl.
*B01D 53/14* (2006.01)
*B01D 53/18* (2006.01)
*C10L 3/10* (2006.01)

(52) U.S. Cl.
CPC ..... *B01D 53/1425* (2013.01); *B01D 53/1412* (2013.01); *B01D 53/1462* (2013.01);
(Continued)

(58) Field of Classification Search
CPC ...... B01D 2252/2023; B01D 2252/204; B01D 2252/20405; B01D 2252/20431;
(Continued)

(56) References Cited

U.S. PATENT DOCUMENTS

| | | | |
|---|---|---|---|
| 4,971,605 A | 11/1990 | Tarman | |
| 5,085,839 A * | 2/1992 | Scott | B01D 53/1412 422/111 |

(Continued)

FOREIGN PATENT DOCUMENTS

CN        105219352 A    1/2016

OTHER PUBLICATIONS

Bougie, et al., "Flat sheet memebrane contactor (FSMC) for CO2 separation using aqueous amine solutions", Chemical Engineering Science (2015) pp. 255-264.

(Continued)

*Primary Examiner* — Cabrena Holecek
(74) *Attorney, Agent, or Firm* — Dinsmore & Shohl LLP

(57) ABSTRACT

Embodiments of methods and associate system for removing acid gas from a sour gas stream are provided. The method includes (1) passing the sour gas stream in a counter-flow arrangement with an encapsulated phase change material and a lean amine based sorbent liquid configured to absorb the acid gas from the sour gas stream in an absorber; (2) separating the rich amine based sorbent liquid and the encapsulated phase change material; (3) passing the rich amine based sorbent liquid to an amine regenerator wherein the rich amine based sorbent liquid is heated to release the absorbed sour gas and regenerate the lean amine based sorbent liquid; and (4) passing the encapsulated phase change material and the regenerated lean amine based sorbent liquid through a cooler to reduce the temperature of the encapsulated phase change material such that the phase change material in the encapsulated phase change material solidifies.

10 Claims, 8 Drawing Sheets

(52) U.S. Cl.
CPC ..... *B01D 53/1475* (2013.01); *B01D 53/1493* (2013.01); *B01D 53/18* (2013.01); *C10L 3/102* (2013.01); *B01D 2252/204* (2013.01); *B01D 2252/2023* (2013.01); *B01D 2252/20405* (2013.01); *B01D 2252/20431* (2013.01); *B01D 2252/20484* (2013.01); *B01D 2252/20489* (2013.01); *B01D 2252/504* (2013.01); *B01D 2252/60* (2013.01); *B01D 2259/657* (2013.01); *C10L 2290/12* (2013.01); *C10L 2290/541* (2013.01)

(58) Field of Classification Search
CPC ........... B01D 2252/20484; B01D 2252/20489; B01D 2252/504; B01D 2252/60; B01D 2259/657; B01D 53/1412; B01D 53/1425; B01D 53/1462; B01D 53/1475; B01D 53/1493; B01D 53/18; C10L 2290/12; C10L 2290/541; C10L 3/102
See application file for complete search history.

(56) References Cited

U.S. PATENT DOCUMENTS 5,749,941 A    5/1998    Jansen et al.
9,314,768 B2   4/2016    Gueret et al.
2011/0290117 A1   12/2011   Takamatsu
2013/0202517 A1   8/2013    Ayala et al.
2016/0288051 A1   10/2016   Brennecke

OTHER PUBLICATIONS

Huang, et al. "Selection of Working Fluids for Organic Rankine Cycle (ORC) in Waste Heat Power Generation System", College of Mechanical Engineering Tongji University (2013) pp. 774-779.

Konuklu et al.,"Review on using microencapsulated phase change materials (PCM) in building applications", Energy and Buildings (2015) pp. 134-155.

Remeli, et al., "Power generation from waste heat using Heat Pipe and Thermoelectric Generator", Energy Procedia (2015) pp. 645-650.

Saleh et al., "Working fluids for low-temperature organic Rankine cycles", Energy (2007) pp. 1210-1221.

Wang et al., "Waste heat recovery through plate heat exchanger based thermoelectric generator system", Applied Energy (2014) pp. 860-865.

Zalba et al., "Review on thermal energy storage with phase change: materials, heat transfer analysis and applications", Applied Thermal Engineering (2003) pp. 251-283.

International Search Report and Written Opinion dated Apr. 16, 2019 pertaining to International application No. PCT/US2019/015935 filed Jan. 31, 2019, 15 pgs.

* cited by examiner

SYSTEM AND METHOD FOR REMOVING ACID GAS FROM A SOUR GAS STREAM

BACKGROUND

Field

Embodiments of the present disclosure generally relate to a methods and systems for removing acid gas from a sour gas stream and more specifically relate to maintaining thermal control of the process with an encapsulated phase change material.

Technical Background

Amine gas treating, also known as amine scrubbing, gas sweetening and acid gas removal, is a processes that uses aqueous solutions of various amines to remove hydrogen sulfide ($H_2S$), carbon dioxide ($CO_2$), and other acid gases from sour gas streams. It is a common unit process used in refineries, petrochemical plants, natural gas processing plants and other industries. Amine gas treating is present in various industries as natural gas commonly contains $H_2S$ and $CO_2$ when removed from the ground. However, it is desirable to have those constituents removed before utilizing the natural gas in further processes as they may cause undesirable side reactions, corrode process piping, or lead to other undesirable outcomes. During amine gas treating the temperature of the aqueous solutions used in the process increase in temperature as a result of the exothermic treating reactions. Left uncontrolled the temperature of the amine gas treating systems may increase to an undesirable point leading to process inefficiencies, equipment damage, processing speed limitations, or other undesirable outcomes. Current amine gas treating processes are limited in their ability to control temperature increase of the aqueous solutions used in the processes.

SUMMARY

Ongoing needs exist for methods and related systems of removing acid gas from a sour gas stream and more specifically methods and related systems which maintaining thermal control of the acid gas removal process. Inclusion of an encapsulated phase change material in the system for acid gas removal provides added temperature control and stability.

According to one embodiment a method of removing acid gas from a sour gas stream is provided. The method includes providing a lean amine based sorbent liquid, wherein the lean amine based sorbent liquid is an amine based sorbent liquid configured to absorb the acid gas from the sour gas stream and providing an encapsulated phase change material, wherein the encapsulated phase change material is a phase change material which changes phase from solid to liquid upon heating encapsulated in a polymeric or inorganic shell with a melting point in excess of the melting point of the phase change material. The method further includes (1) passing the sour gas stream in a counter-flow arrangement with the lean amine based sorbent liquid and the encapsulated phase change material in an absorber, wherein the lean amine based sorbent liquid absorbs the acid gas from the sour gas stream to form a rich amine based sorbent liquid and the encapsulated phase change material absorbs at least a portion of the energy freed by the heat of reaction from the conversion from the lean amine based sorbent liquid to the rich amine based sorbent liquid; (2) separating the rich amine based sorbent liquid and the encapsulated phase change material to generate a rich amine based sorbent liquid stream and an encapsulated phase change material slurry; (3) passing the rich amine based sorbent liquid stream to an amine regenerator wherein the rich amine based sorbent liquid is heated to release the absorbed sour gas and regenerate the lean amine based sorbent liquid; (4) passing the encapsulated phase change material slurry separated from the rich amine based sorbent liquid and the lean amine based sorbent liquid from the amine regenerator through a cooler to reduce the temperature of the encapsulated phase change material and the lean amine based sorbent liquid such that the phase change material in the encapsulated phase change material solidifies; and (5) repeating steps 1 through 4 with the cooled encapsulated phase change material and the lean amine based sorbent liquid from step (4).

In a further embodiment, a system for use in removing acid gas from a sour gas stream in a continuous flow process is provided. The system includes an amine-based absorber comprising a sour gas inlet, a lean amine based sorbent liquid inlet, a sweet gas outlet, and a rich amine based sorbent liquid outlet; a separator having an inlet fluidly connected to the amine-based absorber at the rich amine based sorbent liquid outlet; an amine regenerator fluidly connected to the separator; and a cooler fluidly connected to the separator and the amine regenerator. A lean amine based sorbent liquid configured to absorb the acid gas from the sour gas stream and an encapsulated phase change material are provided to the amine-based absorber at the lean amine based sorbent liquid inlet, wherein the encapsulated phase change material is a material which changes phase from solid to liquid upon heating encapsulated in a polymeric or inorganic shell with a melting point in excess of the melting point of the phase change material. The sour gas is provided as the sour gas stream to the amine-based absorber at the sour gas inlet and the sour gas stream is passed in a counter-flow arrangement with the lean amine based sorbent liquid and the encapsulated phase change material in the amine-based absorber such that the lean amine based sorbent liquid absorbs the acid gas from the sour gas stream to form a rich amine based sorbent liquid and the encapsulated phase change material absorbs at least a portion of the energy freed by the heat of reaction from the conversion from the lean amine based sorbent liquid to the rich amine based sorbent liquid. Further, the sour gas stream with the acid gas is removed to form a sweet gas stream is vented from the amine based absorber at the sweet gas outlet. The rich amine based sorbent liquid with the absorbed acid gas and the encapsulated phase change material is routed from the rich amine based sorbent liquid outlet of the amine-based absorber to the separator. Additionally, the separator is configured to separate the rich amine based sorbent liquid and the encapsulated phase change material to generate a rich amine based sorbent liquid stream and an encapsulated phase change material slurry with the rich amine based sorbent liquid routed to the amine regenerator and the encapsulated phase change material slurry routed to the cooler. The amine regenerator removes the acid gas from the rich amine based sorbent liquid to regenerate the lean amine based sorbent liquid and the lean amine based sorbent liquid from the amine regenerator is recombined with the encapsulated phase change material slurry from the separator before passage through the cooler to reduce the temperature of the encapsulated phase change material and the lean amine based sorbent liquid such that the phase change material in the encapsulated phase change material solidifies. Finally, the encapsulated phase change material and the lean amine based sorbent liquid from the cooler are routed back to the amine-based absorber and fed through the lean amine based sorbent liquid inlet.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
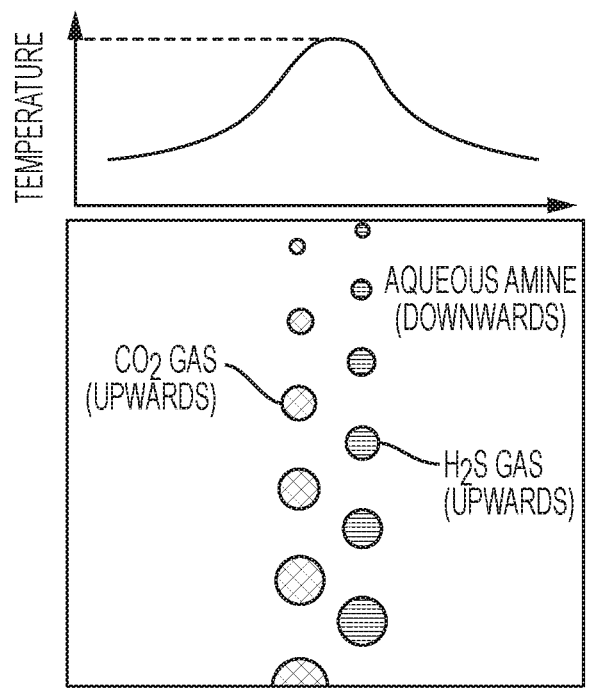
FIG. 1A is a representative temperature profile in a standard amine-based absorption process.

Reference will now be made in detail to embodiments of the method of removing acid gas from a sour gas stream of the present disclosure and associated system.

Sour gas is natural gas or any other gas containing significant amounts of hydrogen sulfide ($H_2S$) or other acid gas such as carbon dioxide which are desirably removed before utilization of the natural gas in further operations. Sour gas with the acid gases eliminated or reduced to below a threshold value is termed sweet gas. Acid gases are deleterious to operations in the oil and gas industry interfering with desired utilization of natural gas. For example, acid gases may interfere with chemical reactions or the simple burning of the natural gas. Additionally, the presence of acid gases in the natural gas may have a corrosive to other undesirable effect on piping and other process systems which in contacts during utilization. As such, the methods of removing acid gas from a sour gas stream and associated systems provided in the present disclosure advance the usability of collected sour gas by the elimination of the acid gases from the provided sour gas stream.

The removal of acids gases from a sour gas may be achieved using an absorption process. An absorption process utilizes a mass transfer operation in which acid gases, such as carbon dioxide or hydrogen sulfide, are absorbed from the sour gas by means of a liquid in which the solute gas is more or less soluble. In the oil and gas industry, a common absorption process is an amine-based process, also known as "amine treating" or "amine scrubbing" to those skilled in the art. In an amine-based process, an amine solution is directly or indirectly contacted with the sour gas to allow for the absorption of acid gases therein for removal.

Amine-based processes for removing acid gases from a sour gas stream have the undesirable effect of an exothermic reaction between the amine solution and the acid gas as part of the absorption process. The exothermic reaction results in a temperature rise of the amine solution over time as more acid gas is absorbed and removed from the sour gas stream. The present disclosure over comes the temperature rise as a result of the exothermic reaction process with the addition of an encapsulated phase change material to the amine solution to control and regulate any temperature rise.

A method of removing acid gas from a sour gas stream includes providing a lean amine based sorbent liquid and an encapsulated phase change material. The lean amine based sorbent liquid is an amine based sorbent liquid configured to absorb the acid gas from the sour gas stream. Additionally, the encapsulated phase change material is a material which changes phase from solid to liquid upon heating encapsulated in a polymeric or inorganic shell. The shell has a melting point in excess of the melting point of the phase change material to allow for the phase change material to change phases while be retained by the intact shell layer. The sour gas is passed in a counter-flow arrangement with the lean amine based sorbent liquid and the encapsulated phase change material in an absorber. The lean amine based sorbent liquid absorbs the acid gas from the sour gas stream to form a rich amine based sorbent liquid and the encapsulated phase change material absorbs at least a portion of the energy freed by the heat of reaction from the conversion from the lean amine based sorbent liquid to the rich amine based sorbent liquid. Subsequently, the rich amine based sorbent liquid and the encapsulated phase change material is substantially separated. The rich amine based sorbent liquid is further passed to a regenerator where the rich amine based sorbent liquid is heated to release the absorbed sour gas and regenerate the lean amine based sorbent liquid. The encapsulated phase change material separated from the rich amine based sorbent liquid and the lean amine based sorbent liquid from the regenerator through a cooler to reduce the temperature of the encapsulated phase change material and the lean amine based sorbent liquid such that the phase change material in the encapsulated phase change material solidifies. The cooled lean amine based sorbent liquid and encapsulated phase change material may then be returned to the absorber to repeat the disclosed process.

Phase change materials (PCM) are substances that absorb and release thermal energy during the process of melting and freezing. When a PCM freezes, it releases a large amount of energy in the form of latent heat at a relatively constant temperature. Conversely, when such material melts, it absorbs a large amount of heat from the environment. PCMs recharge as ambient temperatures fluctuate, making them applicable in an amine based absorber system which requires temperature control.

In one or more embodiments, the encapsulated phase change material comprises a central core material encapsulated in a polymeric or inorganic shell. The central core material changes phase from solid to liquid upon heating and is a PCM. The shell comprises a melting point in excess of the melting point of the phase change material of the core. The disparate melting point temperatures allows the phase change material of the core to absorb thermal energy and transition from a solid to a liquid while the outer shell material remains a solid to encapsulate and constrain the phase change material of the core in a liquid state.

PCMs have been developed for use across a broad range of temperatures, from −40° C. to more than 150° C. They typically store 5 to 14 times more heat per unit volume than materials such as water, masonry or rock allowing for substantial heat absorption from the amine based sorbent liquid. Among various heat storage options, PCMs are particularly attractive because they offer high-density energy storage and store heat within a narrow temperature range.

In one or more embodiments, the encapsulated phase change material may have a temperature of fusion for the phase change material in the range of 40° C. to 100° C. In various further embodiments, the encapsulated phase change material may have a temperature of fusion for the phase change material in the range of 50° C. to 90° C., 55° C. to 85° C., or 60° C. to 80° C. The temperature of fusion of the phase change material may also be selected to correspond with a preferred maximum temperature for the rich amine based sorbent liquid at the exit of the absorber to maintain the amine based sorbent liquid at the preferred maximum temperature. For example, the encapsulated phase change material may have a temperature of fusion of 75° C. to 85° C. or approximately 80° C. For example, the temperature of the rich amine based sorbent liquid may be maintained at or below 85° C., at or below 80° C., at or below 75° C., or at or below 70° C. Maintaining the amine based sorbent liquid below a preferred maximum temperature controls off-specification production, emergency shutdowns from overheating, and reduces potential corrosion from elevated temperatures. In further embodiments, the temperature of fusion of the phase change material may be selected to correspond with a preferred temperature for the lean amine based sorbent liquid to be fed at the entrance of the absorber thereby retaining the amine based sorbent liquid at the feed temperature for the entire absorber process. For example, the encapsulated phase change material may have a temperature of fusion of 55° C. to 65° C. or approximately 60° C. to correspond with the feed temperature for the lean amine based sorbent liquid.

In one or more embodiments, the encapsulated phase change material may have a substantially spherical geometry. The average diameter of the encapsulated phase change material may be in the range of 10 to 10,000 micrometers (μm) with those in the range of 10 to 1,000 μm being termed microencapsulated phase change materials (microPCM) and those in the range of 1,000 to 10,000 being termed macroencapsulated phase change materials (macroPCM). Microencapsulated phase change materials and macroencapsulated phase change materials are universally referenced as mPCMs or encapsulated phase change material in this disclosure. The average diameter of the encapsulated phase change material may be measured using scanning electron microscopy (SEM) on a population of mPCMs samples statistically representative of the bulk mPCM.

The core and shell configuration of the encapsulated phase change materials provides a core of a PCM surrounded by a shell of a material with a higher melting point. In various embodiments, the core-to-shell ratio may be from 60:40 to 95:5. In specific embodiments, with the encapsulated phase change materials typically have a ratio of 80 to 85 percent core and 20 to 15 percent shell.

The encapsulated phase change materials may include a core of any phase change material having the desired melting temperature. Non-limiting examples of phase change materials having a melting temperature in the range of 45° C. to 70° C. are provided in Table 1, Table 2, Table 3, and Table 4. A more expansive listing and description of phase change materials is provided in Zalba, Belén, et al. *Review on Thermal Energy Storage with Phase Change: Materials, Heat Transfer Analysis and Applications Applied Thermal Engineering* 23 (2003) 251-283, the contents of which are incorporated herein by reference.

TABLE 1

Inorganic Phase Change Materials

| Phase Change Material | Melting Temperature (° C.) | Heat of Fusion (kJ/kg) |
|---|---|---|
| $K_3PO_4 \cdot 7H_2O$ | 45 | n/a |
| $Zn(NO_3)_2 \cdot 4H_2O$ | 45.5 | n/a |
| $Ca(NO_3)_2 \cdot 4H_2O$ | 42.7 | n/a |
|  | 47 | n/a |
| $Na_2HPO_4 \cdot 7H_2O$ | 48 | n/a |
| $Na_2S_2O_3 \cdot 5H_2O$ | 48 | 201 |
|  | 48-49 | 209.3 |
| $Zn(NO_3)_2 \cdot 2H_2O$ | 54 | n/a |
| $NaOH \cdot H_2O$ | 58 | n/a |
| $Na(CH_3COO) \cdot 3H_2O$ | 58 | 264 |
|  | 58.4 | 226 |
| $Cd(NO_3)_2 \cdot 4H_2O$ | 59.5 | n/a |
| $Fe(NO_3)_2 \cdot 6H_2O$ | 60 | n/a |
| NaOH | 64.3 | 227.6 |
| $Na_2B_4O_7 \cdot 10H_2O$ | 68.1 | n/a |
| $Na_3PO_4 \cdot 12H_2O$ | 69 | n/a |
| $Na_2P_2O_7 \cdot 10H_2O$ | 70 | 184 |

TABLE 2

Organic Phase Change Materials

| Phase Change Material | Melting Temperature (° C.) | Heat of Fusion (kJ/kg) |
|---|---|---|
| Paraffin $C_{20}$-$C_{33}$ | 48-50 | 189 |
| Paraffin $C_{22}$-$C_{45}$ | 58-60 | 189 |
| Parffin wax | 64 | 173.6 |
|  |  | 266 |
| Polyglycol E6000 | 66 | 190 |
| Paraffin $C_{21}$-$C_{50}$ | 66-68 | 189 |

TABLE 3

Commercially Available Phase Change Materials

| Phase Change Material (Commercial Source) | Melting Temperature (° C.) | Heat of Fusion (kJ/kg) |
|---|---|---|
| STL47 (Mitsubishi Chemical) | 47 | 221 |
| ClimSel C 48 (Climator) | 48 | 227 |
| STL52 (Mitsubishi Chemical) | 52 | 201 |
| RT50 (Rubitherm GmbH) | 54 | 195 |
| STL55 (Mitsubishi Chemical) | 55 | 242 |
| TH58 (TEAP) | 58 | 226 |
| ClimSel C 58 (Climator) | 58 | 259 |
| RT65 (Rubitherm GmbH) | 64 | 207 |
| ClimSel C 58 (Climator) | 70 | 194 |

TABLE 4

Fatty Acid Phase Change Materials

| Phase Change Material | Melting Temperature (° C.) | Heat of Fusion (kJ/kg) |
|---|---|---|
| Myristic Acid | 49-51 | 204.5 |
|  | 54 | 187 |
|  | 58 | 186.6 |
|  | 64 | 185.4 |
| Palmitic Acid | 61 | 203.4 |
|  | 63 | 187 |
|  | 69 | 202.5 |
| Stearic Acid | 60-61 | 186.5 |
|  | 70 | 203 |

The encapsulated phase change materials may include a shell of any material having appropriate chemical resistance and a melting point in excess of the working environment. Non-limiting examples of shell materials include low-density polyethylene, ethylene vinyl acetate, titanium dioxide, silica, polyurethane, urea/formaldehyde, melamine/formaldehyde, polystyrene and polymethyl methacrylate Amine based absorption processes utilize amine based sorbent liquids to complete the absorption process. The amine based sorbent liquids in one or more embodiments may be aqueous amine solutions. In various embodiments, the amine based sorbent liquid may be one or more of monoethanolamine (MEA), diethanolamine (DEA), diglycolamine (DGA), di-isopropanolamine (DIPA), N-methyl-diethanolamine (MDEA), triethanolamine (TEA), piperazine (PZ) and 2-amino-2-methyl-1-propanol (AMP).

The interaction of the amine based sorbent liquids and the acids gases in the sour gas stream results in an exothermic reaction. The extent of the absorption reaction's exothermicity may vary depending on the specific acid gas absorbed and the specific amine or amines utilized in the amine based sorbent liquid. Specifically, the heat of reaction generally decreases in a progression from primary to tertiary amines.

As the temperature of the amine based sorbent liquid increases from the heat of reaction for the conversion from the lean amine based sorbent liquid to the rich amine based sorbent liquid as a result of absorbing acid gas components, the encapsulated phase change material absorbs the released exothermic energy. Specifically, the phase change material of the core absorbs thermal energy from the surrounding amine based sorbent liquid resulting in sequestration of the thermal energy as the heat required to transition from solid to liquid (heat of fusion). This phenomenon allows the temperature of the amine based sorbent liquid to be maintained at or below the melting temperature of the phase change material of the core until all the encapsulated phase change material has transitioned from solid to liquid.

Figure 1B:
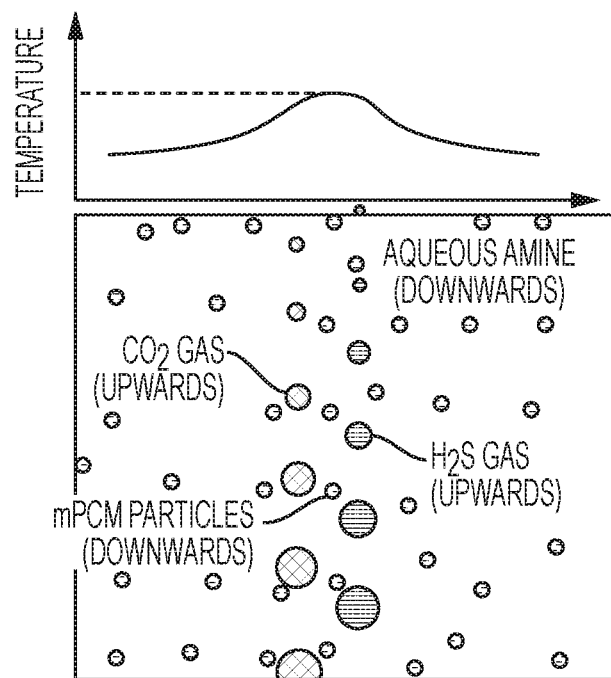
FIG. 1B is a representative temperature profile in an enhanced amine-based absorption process with encapsulated phase change material in accordance with one or more embodiments of the present disclosure.

With reference to FIGS. 1A and 1B, the effect of inclusion of the encapsulated phase change material is illustrated in representative temperature profiles. Each temperature profile is representative of the temperature across the width of the illustration below each temperature profile. FIG. 1A provides an illustration of the counter flow of the amine based sorbent liquid in a first direction and $H_2S$ and $CO_2$ (acid gases) in a second direction along with a representative temperature profile. The thermal energy released as a result of the heat of reaction from the conversion from the lean amine based sorbent liquid to the rich amine based sorbent liquid results in the temperature spiking up to an elevated level. Conversely. FIG. 1B provides an illustration of the counter flow of the amine based sorbent liquid in a first direction and $H_2S$ and $CO_2$ (acid gases) along with an encapsulated phase change material in a second direction along with a representative temperature profile. The thermal energy released as a result of the heat of reaction from the conversion from the lean amine based sorbent liquid to the rich amine based sorbent liquid results in the temperature spiking up to an elevated level, but the temperature elevation is tempered and may be specifically controlled or capped by the inclusion of the encapsulated phase change material.

Figure 2:
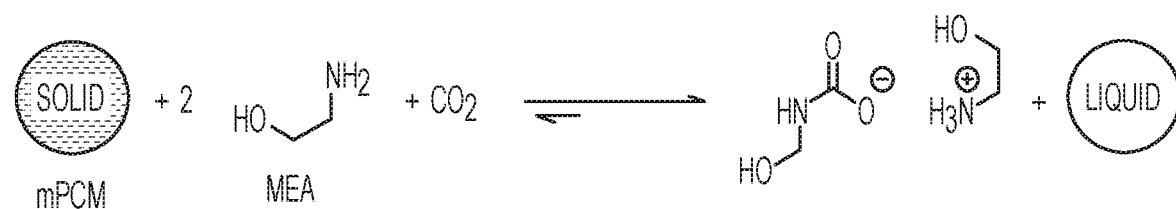
FIG. 2 is a schematic illustration of an absorption reaction of monoethanolamine (MEA) with carbon dioxide in the presence of encapsulated phase change material in accordance with one or more embodiments of the present disclosure.

With reference to FIG. 2, an example absorption reaction of an acid gas by the amine based sorbent liquid is illustrated. Specifically, the absorption of $CO_2$ by MEA is shown along with the resulting products. FIG. 2 additionally illustrates the transition of the PCM in the core of the encapsulated phase change material from a solid state to a liquid state as a result of the heat of reaction of absorption reaction process. The particular absorption reaction illustrated in FIG. 2 has a change in enthalpy from the absorption ($\Delta H_{abs}$) of approximately 0 kJ/mol as a result of the phase change of the PCM from solid to liquid entraining the heat generated from the underlying exothermic reaction. The absorption reaction without the presence of the PCM would have a $\Delta H_{abs}$ of −81 kJ/mol $CO_2$.

The temperature inside the absorber where the amine based sorbent liquid and acid gases interface is an important factor of the amine based process for removing acid gas from a sour gas stream, as it influences directly the loading capacity of the amine based sorbent liquid and corrosion rate of process equipment. The loading capacity of the amine based sorbent liquid is a measure of the number of moles of acid gas which may be absorbed for each mole of the amine. Detrimental effects including amine degradation, formation of stable salts, corrosion and reduction in acid gas capture are predominant at high temperature. Moreover, the absorption process between the amine based sorbent liquid and acid gas is more effective at low or ambient temperatures than at elevated temperature. The temperature at the top of the absorber is typically between 35-50° C. in traditional amine-based acid gas removal systems. The temperature at the bottom of the absorber is typically between 80-90° C. in traditional amine-based acid gas removal systems with the temperature rise from the exothermic absorption reaction.

The control of temperature inside the absorber has traditionally been managed either by controlling the flow of acid gas, or amine based sorbent liquid, thereby regulating the rate of heat formation or by using an external cooler to reduce the temperature of the amine during transit through the absorber.

In general, an amine based absorption process includes two columns with one serving as an absorber and the other serving as a regenerator. The absorber provides a counterflow arrangement to contact the amine based sorbent liquid and the sour gas comprising the acid gases to provide an opportunity for the acid gases to be absorbed by the amine based sorbent liquid. The regenerator serves to free the acid gas captured by the amine based sorbent liquid and specifically regenerate lean amine based sorbent liquid from a rich amine based sorbent liquid saturated with captured acid gas.

Figure 3:
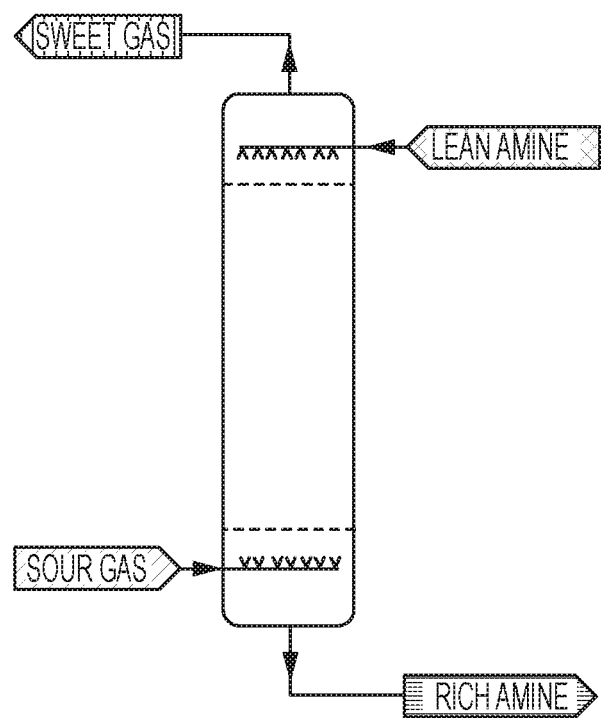
FIG. 3 is a schematic illustration of a generic absorber in an amine-based sour gas removal system.

With reference to FIG. 3, a general absorber is illustrated in accordance with one system for contacting the amine based sorbent liquid and the sour gas. The absorber includes a cylindrical column or tower equipped with a sour gas inlet and a gas distributing space at the bottom of the column. The absorber further includes a liquid inlet to provide the amine based sorbent liquid and a liquid distributor at the top of the column. The introduction of the sour gas at the bottom of the absorber column and amine based sorbent liquid at the top of the absorber column causes the counterflow as the gases rise and the liquids fall. The rising gas may then be exhausted as sweet gas after the removal of the acid gases at the top of the absorber column. Similarly, the falling amine based sorbent liquid may be exhausted as rich amine based sorbent liquid saturated with absorbed acid gases at the bottom of the absorber column. The space between the liquid distributor at the top of the absorber column and the gas distributing space at the bottom of the absorber column is typically filled with tower packing in the form of insert solid shapes to disrupt flow or a series of contactor trays as familiar to those skilled in the art. The tower packing extends the time for contact between the amine based sorbent liquid and the sour gas to improve transfer of the acid gases from the sour gas to the amine based sorbent liquid.

Figure 4:
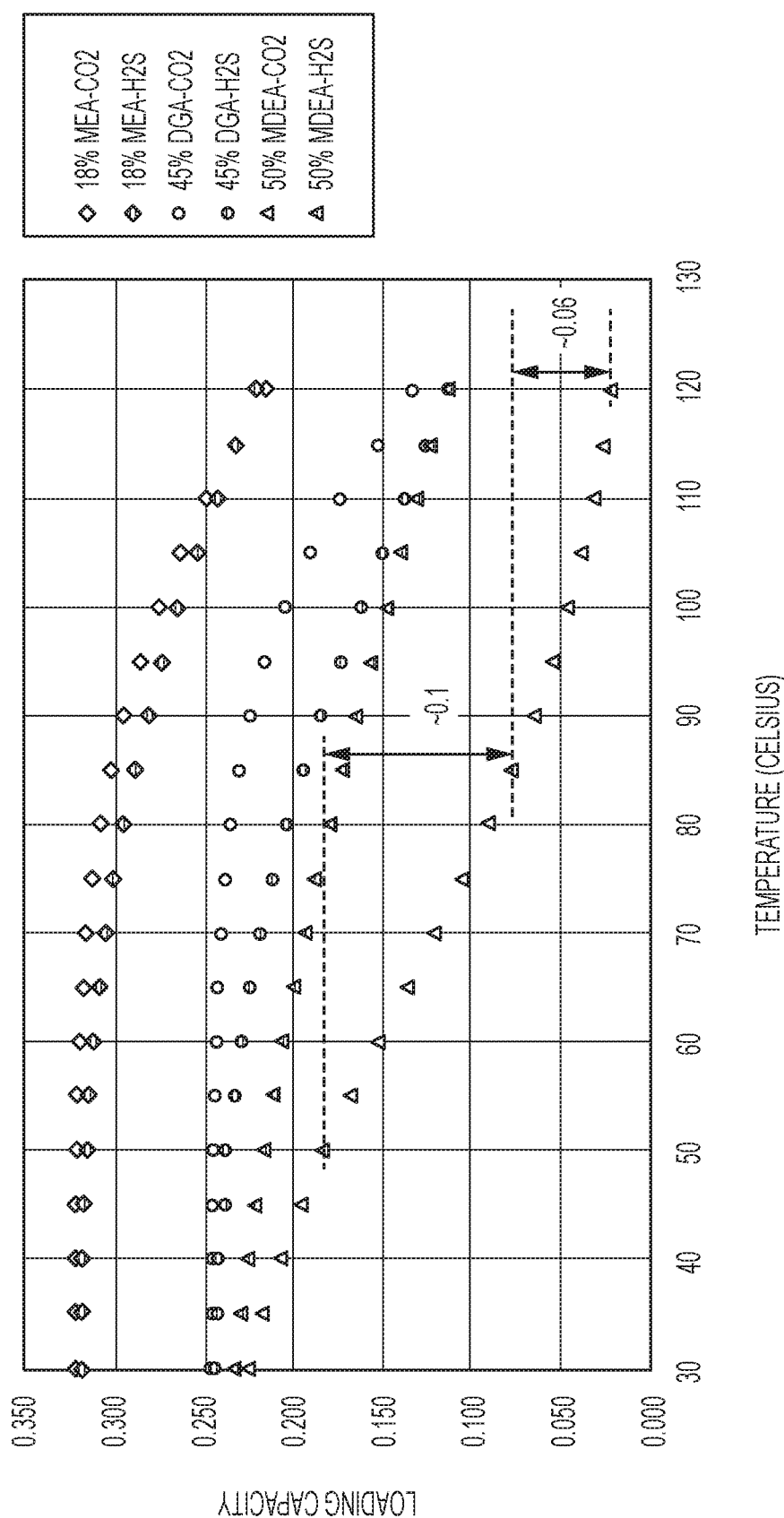
FIG. 4 is a graph of the loading capacity of various amines for a stream of 5 mol % carbon dioxide ($CO_2$) in 95 mol % dry Nitrogen or 5 mol % hydrogen sulfide in 95 mol % dry Nitrogen as a function of temperature.

The loading capacity of acid gas in the amine based sorbent liquid varies with respect to the temperature of the amine based sorbent liquid. With reference to FIG. 4, the loading capacity of an aqueous solution of 18 wt % Monoethanolamine (MEA), 45 wt % Diglycolamine (DGA) and 50 wt % Methyl diethanolamine (MDEA) for 5 mol % carbon dioxide ($CO_2$) in 95 mol % dry Nitrogen or 5 mol % hydrogen sulfide in 95 mol % dry Nitrogen as a function of temperature is provided. Traditional amine-based sorbent systems have a temperature of the lean amine around 50° C. at the top of the absorber, a temperature of the rich amine of approximately 85° C. at the bottom of the absorber, and a temperature at the reboiler of the regenerator of about 120° C. In the case of 50 wt % MDEA and as annotated on FIG. 4, approximately 0.1 mole of $CO_2$ per mole of amine is released back in the absorber as a result of heating the amine from 50° C. to 85° C. Additionally, approximately 0.06 mole of $CO_2$ per mole of amine is released at the regenerator with an operating temperature of 120° C. and approximately 0.02 mole of $CO_2$ per mole of amine is retained by the amine exiting the regenerator. FIG. 4 illustrates a decrease in efficiency of the absorber with elevation of the amine temperature. In maintaining the temperature of the amine at 50 to 60° C., the amount of $CO_2$ captured by the amine effectively would be around 0.16 mole of $CO_2$ per mole of amine, therefore increasing the removal of $CO_2$ by 62%.

The hydrogen sulfide selectivity is the ratio of the molar quantity of $H_2S$ per the molar amount of $CO_2$ retained in the amine. With reference to FIG. 4, the position and the spacing of the $H_2S$ point in relation to the $CO_2$ provides an indication of the selectivity of the amine for $H_2S$.

Figure 5:
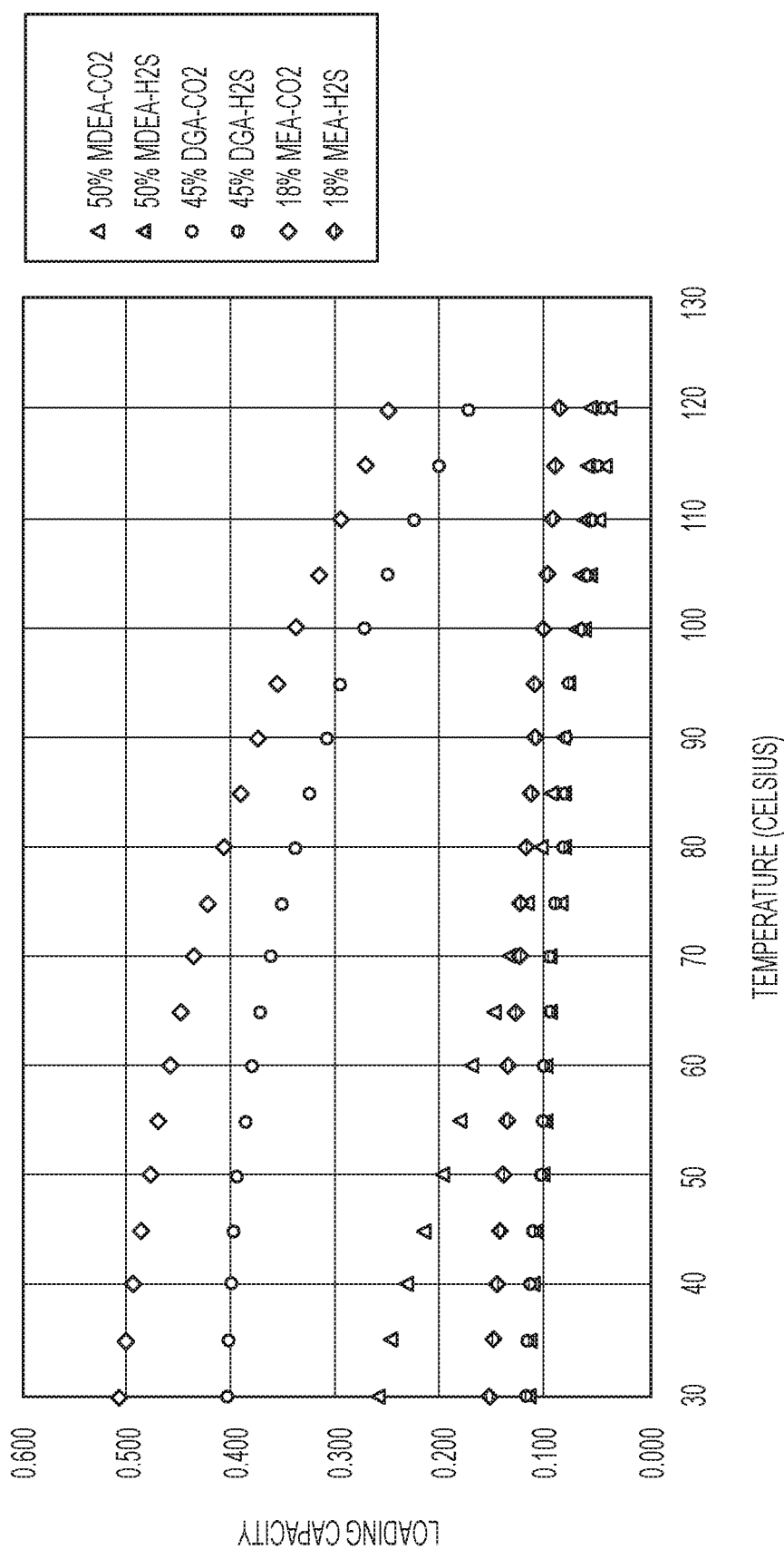
FIG. 5 is a graph of various amines for a stream of 7 mol % $CO_2$ and 3 mol % $H_2S$ in 90 mol % of wet sweet gas (~0.5 mol % water vapor).

Sour gas generally comprises about 1 to 10 mol % $CO_2$ and 1 to 5 mol % $H_2S$ with $H_2S$ spikes as high as 20 mol % depending on gas field. With reference to FIG. 5, the absorption of sour gases from a stream 7 mol % $CO_2$ and 3 mol % $H_2S$ in 90 mol % of wet sweet gas (~0.5 mol % water vapor) is illustrated. As such, FIG. 5 provides absorption characteristics for a sour gas stream in conformity with normally encountered sour gas collected from a gas field. In addition, the lean amine solutions entering the absorber are commonly preloaded with residual acid gas not removed during regenerator operations. Typically 7 mol % acid gas remaining in 18 wt % MEA, 2 mol % acid gas remains in 45 wt % DGA, and 0.2 mol % acid gas remains in 50 wt % MDEA.

The gap between the loading capacity of the lean amine, which is the loading capacity at the reboiler, and the loading capacity of the rich amine is the effective molar amount of $CO_2$ or $H_2S$ captured per molar quantity of amine. If the heat of reaction is expressed in Joule per mole of $CO_2$ reacted, then the heat generated per mole of amine is the multiplication of the heat of reaction by this above difference of loading capacities. The total amount of heat generated per unit of time is the subsequent multiplication of the heat generated per mole of amine by the molar flow of free amine. Free amine is the amine not complexed by a molecule of acid gas.

Temperature control of the absorber is beneficial to absorber operation. With a column absorber a traditional method of attempting to maintain temperature control is with the introduction of an intercooler. An intercooler is a heat exchanger placed for cooling the effluent of amine based sorbent liquid between trays. Specifically, at least a portion of the downstream stream from one tray is removed and passed through the heat exchanger to remove at least a portion of the heat retained in the amine based sorbent liquid, and then reintroduced at a tray above the point of removal. This system provides a dip in the temperature of the amine based sorbent liquid as it progresses down the absorber column. However, though the intercooler decreases the temperature at the level of the predefined tray with the intercool, the temperature fluctuates among the many trays of the absorber column making process control challenging. Conversely, with the encapsulated phase change material, improved temperature control along the entire length of the absorber column is provided by the PCM core melting at a given temperature which maintains the temperature of the amine based sorbent liquid constant.

Figure 6A:
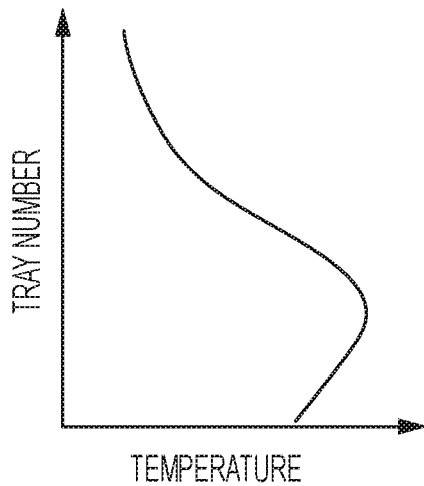
FIG. 6A is a representative temperature profile in a standard amine-based absorption process in the generic absorber of FIG. 3.
Figure 6B:
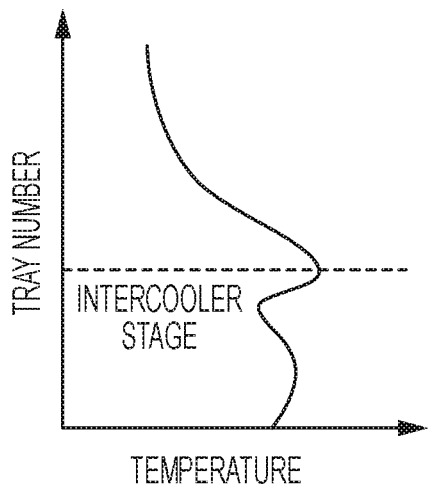
FIG. 6B is a representative temperature profile in a standard amine-based absorption process in the generic absorber of FIG. 3 with the addition of an intercooler stage.
Figure 6C:
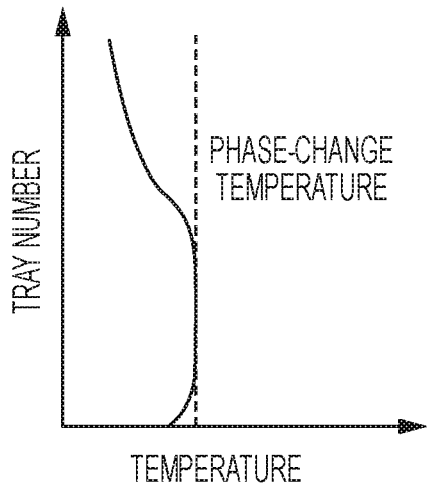
FIG. 6C is a representative temperature profile in an enhanced amine-based absorption process in the generic absorber of FIG. 3 with the addition of encapsulated phase change material in accordance with one or more embodiments of the present disclosure

With reference to FIGS. 6A, 6B, and 6C, generalized temperature profiles along an absorber column length are illustrated for uncooled, intercooler cooled, and encapsulated phase change material cooled absorbers. FIG. 6A illustrates that the temperature of the amine based sorbent liquid substantially increases with each sequential tray in the absorber column when no cooling mechanism is provided. FIG. 6B illustrates the improvement provides by an intercooler stage provided between two trays to temporarily temper the temperature increase of the amine based sorbent liquid. The intercooler pulls the temperature of the amine based sorbent liquid partially down before it rises once again after the intercooler. The introduction of the encapsulated phase change material in accordance with the present disclosure, as illustrated in FIG. 6C, allows the temperature of the amine based sorbent liquid to rise until the melting point of the PCM core of the encapsulated phase change material is reached and then maintained at that temperature. The temperature is maintained because as additional heat is released from further acid gas absorption, additional cores of the encapsulated phase change materials melt to capture and sequester the heat. The optimum temperature for amine based sorbent liquid and acid gas interaction and absorption may be maintained based on selection of an encapsulated phase change material with a core formed from a PCM with the desired melting point.

Figure 7:
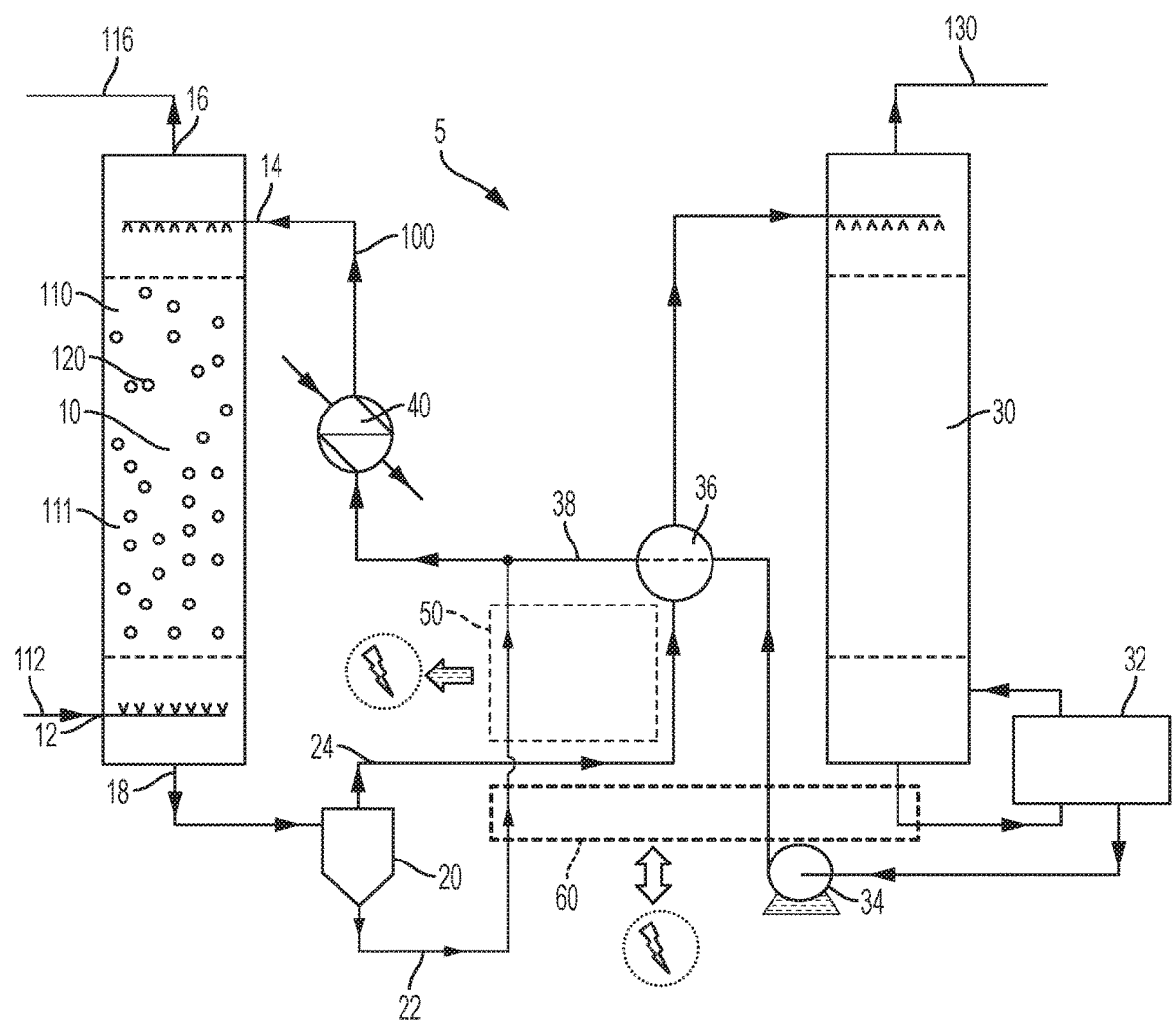
FIG. 7 is a process flow diagram of a system for use in removing acid gas from a sour gas stream in a continuous flow process in accordance with one or more embodiments of the present disclosure.
Figure 8:
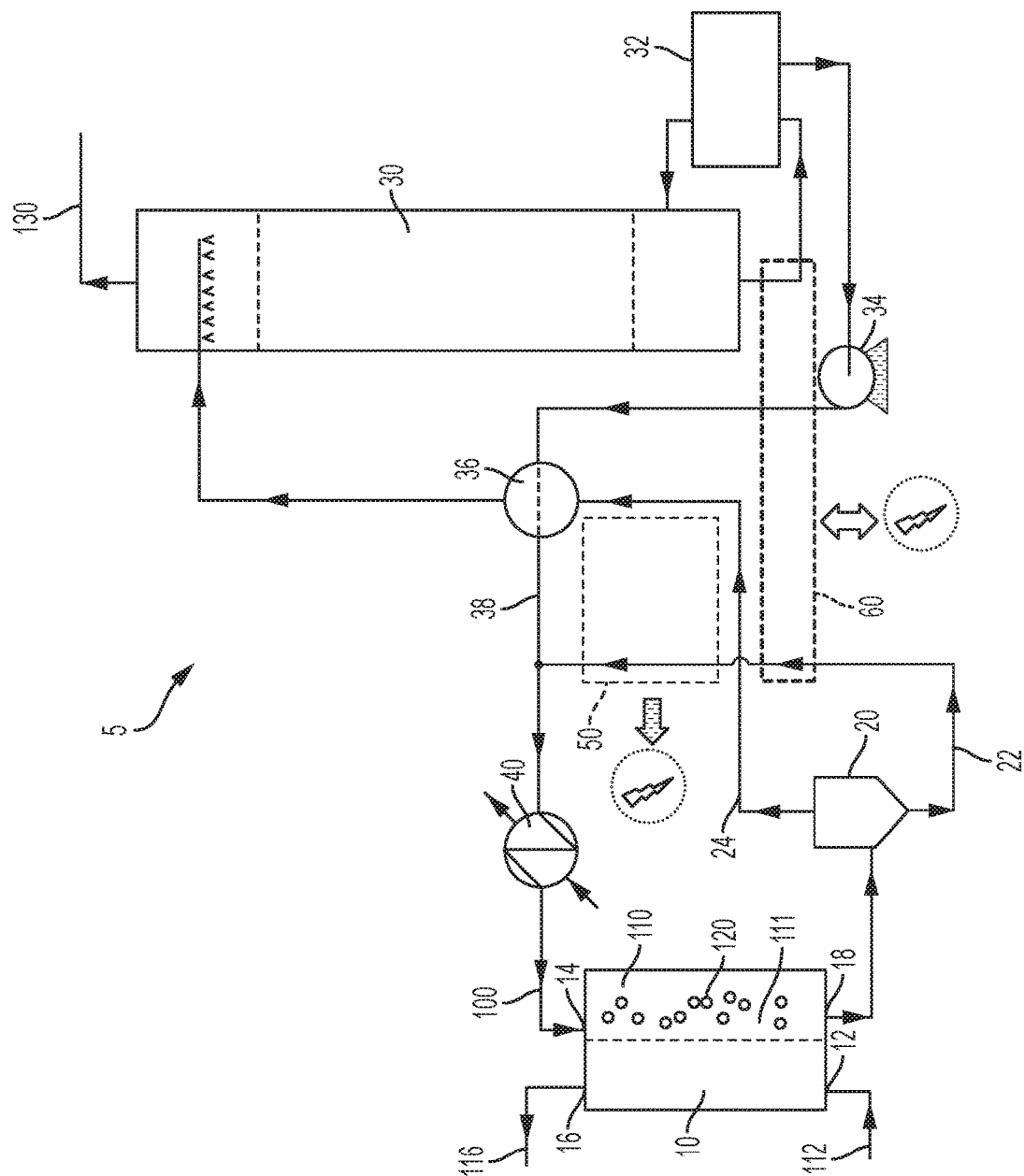
FIG. 8 is a process flow diagram of a system for use in removing acid gas from a sour gas stream in a continuous flow process in accordance with one or more embodiments of the present disclosure.
Figure 9:
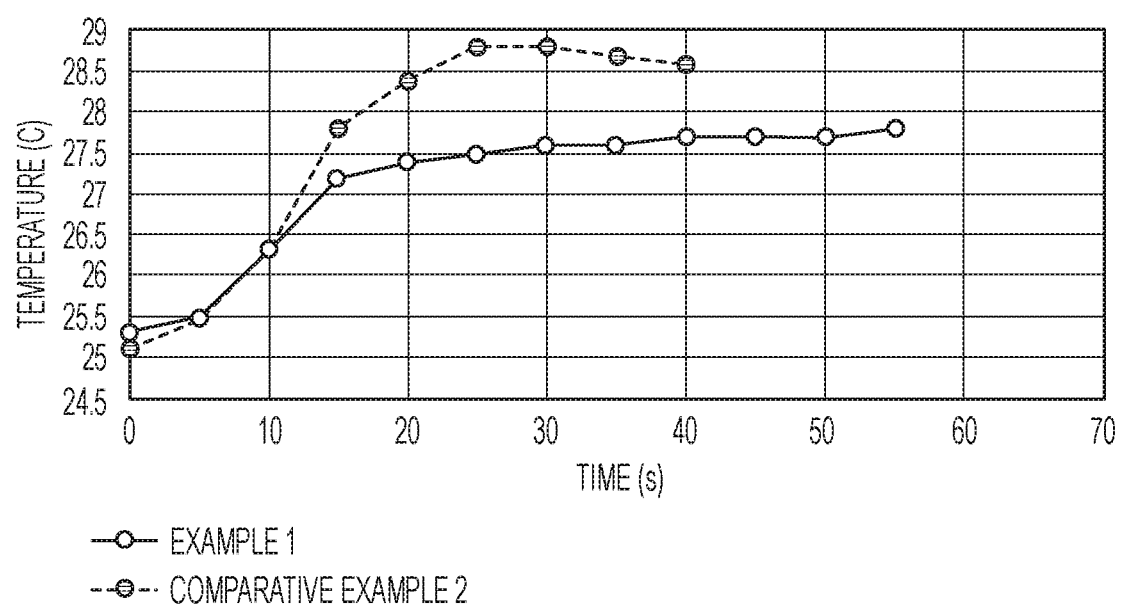
FIG. 9 is a graph of temperature increase with respect to time upon introduction of $CO_2$ to a monoethanolamine solution and to a monoethanolamine solution with an encapsulated phase change material in accordance with the present disclosure.

Through the systems for use in removing acid gas from a sour gas stream in a continuous flow process (acid gas removal system) 5 of FIGS. 7 and 8 are provided as exemplary, it should be understood that the present system and methods encompass other configurations.

The system 5 includes an amine-based absorber 10 comprising a sour gas inlet 12, a lean amine based sorbent liquid inlet 14, a sweet gas outlet 16, and a rich amine based sorbent liquid outlet 18; a separator 20 having an inlet fluidly connected to the amine-based absorber 10 at the rich amine based sorbent liquid outlet 18; an amine regenerator 30 fluidly connected to the separator 20; and a cooler 40 fluidly connected to the separator 20 and the amine regenerator 30.

In one or more embodiments, an absorber feed stream 100 comprising a lean amine based sorbent liquid 110 configured to absorb the acid gas from the sour gas stream 112 and an encapsulated phase change material 120 are provided to the amine-based absorber 10 at the lean amine based sorbent liquid inlet 14. Concurrently, the sour gas is provided as the sour gas stream 112 to the amine-based absorber 10 at the sour gas inlet 12. The sour gas stream 112 is passed in a counter-flow arrangement with the lean amine based sorbent liquid 110 and the encapsulated phase change material 120 in the amine-based absorber 10 such that the lean amine based sorbent liquid 110 absorbs the acid gas from the sour gas stream 112 to form a rich amine based sorbent liquid 111 and the encapsulated phase change material 120 absorbs at least a portion of the energy freed by the heat of reaction from the conversion from the lean amine based sorbent liquid 110 to the rich amine based sorbent liquid 111.

In one or more embodiments the absorber feed stream 100 comprises a volume fraction of the encapsulated phase change material 120 of 5 volume percent to 35 volume percent. A lesser volume percent of the encapsulated phase change material 120, such as below 15 volume percent, equates to controlling the rise in temperature of the absorber feed stream 100. A greater volume percent of the encapsulated phase change material 120, such as greater than 15 volume percent, equates to maintaining the temperature of the absorber feed stream 100 at the temperature of fusion of the encapsulated phase change material 120.

During the counter flow of the lean amine based sorbent liquid 110 and the sour gas stream 112, the acid gas is absorbed from the sour gas stream 112 and into the lean amine based sorbent liquid. The sour gas stream 112 with the acid gas removed forms a sweet gas stream 116 which is vented from the amine-based absorber 10 at the sweet gas outlet 16.

The rich amine based sorbent liquid 111 with the absorbed acid gas and intermixed with the encapsulated phase change material 120 is routed from the rich amine based sorbent liquid outlet 18 of the amine-based absorber 10 to the separator 20. In one or more embodiments the separator 20 is configured to separate the rich amine based sorbent liquid 111 and the encapsulated phase change material 120 to generate a stream of the rich amine based sorbent liquid 24 and a phase change material slurry 22 comprising a stream of the encapsulated phase change material 120 in a slurry with residual amine based sorbent liquid. In various embodiments, the phase change material slurry 22 of encapsulated phase change material 120 comprises less than 20 volume percent (vol %), less than 18 vol %, less than 15 vol %, less than 12 vol %, or less than 10 vol % of residual rich amine based sorbent liquid 111. The residual rich amine based sorbent liquid 111 varies in amount based on the type of separator 20 utilized. For example, if a hydrocyclone is used as the separator 20, the residual rich amine based sorbent liquid may comprise between 5 vol % to 20 vol %. The volume of residual rich amine based sorbent liquid may be decreased to less than 5 vol % by using a different separator, such as belt filter or rotary drum filter. In this case, the wet mPCMs are transferred using a screw conveyor, or a belt conveyor, as a wet solid to a tank fitted with a solid dispenser or feeder, connected to a reboiler lean amine stream 38 comprising the lean amine exiting the regenerator 30.

The stream of the rich amine based sorbent liquid 24 is routed to the amine regenerator 30 and the phase change material slurry 22 is routed to the cooler 40.

Separating the rich amine based sorbent liquid 111 and the encapsulated phase change material 120 prior to introduction of the stream of the rich amine based sorbent liquid 24 to the amine regenerator 30 allows for a reduction in wasted energy. Specifically, the amine regenerator 30 operates at a significantly greater temperature than the amine-based absorber 10 resulting in unnecessarily increasing the thermal energy stored in the encapsulated phase change material 120 if passed to the regenerator along with the stream of the rich amine based sorbent liquid 24. For example, the encapsulated phase change material may exit the amine-based absorber 10 at approximately 82° C. where the inlet stream of the amine regenerator 30 may be elevated to approximately 104° C. The 22° C. temperature difference would need to be achieved by heating the encapsulated phase change material 120 using additional fuel over that necessary to heat solely the stream of the rich amine based sorbent liquid 24. Additionally, operation of the amine regenerator 30 may require further increase of the feed stream to approximately 127° C. before exiting the amine regenerator 30. The additional 23° C. temperature increase would require even further fuel. The process inefficiencies created if the encapsulated phase change material 120 were not separated from the rich amine based sorbent liquid 111 would be further exacerbated in that the encapsulated phase change material 120 must be cooled to the inlet temperature of the amine-based absorber 10 and below the temperature of fusion of the encapsulated phase change material 120, for example approximately 60° C.

The stream of the rich amine based sorbent liquid 24 is routed to the amine regenerator 30 where the amine regenerator 30 removes the acid gas from the rich amine based sorbent liquid 111 to regenerate the lean amine based sorbent liquid 110. The rich amine based sorbent liquid 111 in the stream of the rich amine based sorbent liquid 24 includes the captured acid gas from the sour gas stream 112. The stream of the rich amine based sorbent liquid 24 separated from the encapsulated phase change material 120 in the separator 20 is pumped to the top of the amine regenerator 30. In the amine regenerator 30, the rich amine based sorbent liquid 111 is counter-currently contacted with hot vapor from an amine regenerator reboiler 32 at the bottom of the column forming the amine regenerator 30. The captured acid gas stripped off the rich amine based sorbent liquid 111 is recovered from the top of the amine regenerator 30 as an acid gas stream 130, while lean amine based sorbent liquid 110 is recovered from the bottom of the amine regenerator 30. The lean amine based sorbent liquid 110 recovered from the bottom of the amine regenerator 30 is passed along as the reboiler lean amine stream 38.

Still with reference to FIGS. 7 and 8, the lean amine based sorbent liquid 110 from the amine regenerator 30 is recombined with the encapsulated phase change material 120 from the separator 20 to reform the absorber feed stream 100 before passage through the cooler 40. The cooler 40 reduces the temperature of the encapsulated phase change material 120 and the lean amine based sorbent liquid 110 such that the phase change material in the encapsulated phase change material 120 solidifies. The cooled lean amine based sorbent liquid 110 and encapsulated phase change material 120 from the cooler 40 are subsequently routed back to the amine-based absorber 10 and fed through the lean amine based sorbent liquid inlet 14 to complete a closed circuit flow of the absorber feed stream 100.

The lean amine based sorbent liquid 110 from the amine regenerator 30 may be further processed before rejoining the encapsulated phase change material 120 from the separator 20 at the cooler 40. Specifically, in one or more embodiments, the lean amine based sorbent liquid 110 from the amine regenerator 30 may be conveyed to the cooler via a pump 34. The pump may be of any style known to those skilled in the art. Additionally, the lean amine based sorbent liquid 110 from the amine regenerator 30 may pass through a heat exchanger 36 along with the rich amine based sorbent liquid 111 exiting the separator 20 to transfer heat from the lean amine based sorbent liquid 110 to the rich amine based sorbent liquid 111 and reduce the energy demands of the system 5.

In further embodiments, the system 5 additionally includes an electrical generator 50 to capture heat stored in the encapsulated phase change material 120 exiting the separator 20 and produce electrical power. For example, electrical power may be generated using a low-temperature power generation organic rankine cycle. Details of such power generation may be found in Saleh. B. Koglbauer, G. Wendland, M. Fischer, J. *Working fluids for low-temperature organic Rankine cycles. Energy.* 2007. 32. 1210-1221. and Han, Z. H. Yu. Y. D. *Selection of Working Fluids for Low-Temperature Power Generation Organic Rankine Cycles System. Advanced Materials Research.* 2012. 1509-1513, both of which are incorporated by reference. Electrical power may also be generated using a thermoelectric generator using the difference of temperature between the outside environment (Cold side) and the encapsulated phase change material 120 exiting the separator 20 (Hot side). Details of a thermoelectric generator may be found in Wang, T. Luan, W. Wang, W. Tu, S.-T. *Waste heat recovery through plate heat exchanger based thermoelectric generator system. Applied Energy.* 2014.136. 860-865. and Remeli, M. F. Kiathodin, L. Singh. B. Verojpom, K. Date. A. Akbarzadeh, A. *Power Generation from Waste Heat Using Heat Pipe and Thermoelectric Generator. Energy Procedia.* 2015. 75. 645-650, both of which are incorporated by reference.

In further embodiments, the system 5 may include a heat transfer system 60 to transfer heat stored in the encapsulated phase change material 120 exiting the separator 20 to the amine regenerator 30. Specifically, in various embodiments, the heat transfer system 60 may include a heat pump or thermoelectric cooler configured to cool the encapsulated phase change material 120 exiting the separator 20 and heat the rich amine based sorbent liquid 111 at the amine regenerator 30 through a heat transfer process. The rich amine based sorbent liquid 111 may be heated at the inlet to the amine regenerator 30 or may be heated at the inlet to the amine regenerator reboiler 32.

In one or more embodiments, the amine-based absorber 10 includes a cylindrical column or tower equipped with a gas distributing space at the bottom of the column proximal the sour gas inlet 12 as previously described with reference to FIG. 3. Introduction of the sour gas at the bottom of the absorber column and amine based sorbent liquid at the top of the absorber column causes counterflow as the gases rise and the liquids fall. This configuration of the system 5 is illustrated in FIG. 7. The inclusion of the encapsulated phase change material 120 with the lean amine based sorbent liquid 110 allows the encapsulated phase change material 120 to capture heat generated during the absorption process. It will be appreciated that the amine-based absorber 10, in some embodiments, may also include one or more intercoolers between trays in conjunction with the encapsulated phase change material 120 to further enhance cooling and temperature regulation.

In one or more embodiments, the amine-based absorber 10 includes a membrane contactor for transfer of the acid gases to the lean amine based sorbent liquid 110. This configuration of the system 5 is illustrated in FIG. 8. The encapsulated phase change material 120 and the lean amine based sorbent liquid 110 pass on one side of a membrane and the sour gas stream 112 passes through the amine-based absorber 10 on the other side of the membrane in a counter-current manner. As the lean amine based sorbent liquid 110 and the sour gas stream 112 pass sour gases are able to pass through the membrane and are absorbed by the lean amine based sorbent liquid 110. It will be approached that an intercooler is not a feasible cooling option with a membrane contactor as the arrangement does not include trays within a column. As such, the inclusion of the encapsulated phase change material 120 with the lean amine based sorbent liquid 110 provides heat absorption and temperature stabilization in a system which would otherwise only be able to be thermally regulated by controlling the flow of sour gas.

The selection of membrane for utilization in the membrane contactor may be based on the specific amine, the composition of the sour gas, the flow rate of the sour gas, and other factors known to one having skill in the art. In various specific embodiments, the membrane may be comprised of polypropylene (PP), polyethylene (PE), polytetrafluoroethylene (PTFE), polyvinylidene fluoride (PVDF), polysulfone (PSU), or a combination of one or more of the delineated materials. In one or more embodiments, the membrane contactor may be configured as hollow fiber modules. In various embodiments, the gas phase may be internal or external to the hollow fibers. When the liquid phase comprising the amine and phase change material is internal to the hollow fibers and the gas phase is external to the hollow fibers, the hollow fibers may comprise an internal diameter ranging between 15 µm and 10,000 µm. The diameter of the mPCMs is preferably less than 0.75 times the internal diameter of the hollow fiber to avoid plugging. Another embodiment is to configure the membrane contactor as a module of flat sheets, where the sour gas and the mixture of mPCMs and aqueous amine solution are separated by one or more flat sheets. When more than one membrane is used in the membrane contactor, the liquid flow at the outlet of the first membrane may be directed to the inlet of the second membrane and so on; such that the liquid flow circulation in the contactor is in series in respect to all membranes. In one or more embodiments, the distance between flat sheets may be greater than 15 μm and less than 10,000 μm. The diameter of the mPCMs is preferably less than 0.75 times the distance between flat sheets to allow flow of the mPCMs therebetween without clogging. In further embodiments, the distance between flat sheets is greater than 10,000 μm.

The separator 20 may be any liquid-solid separation mechanism known to those skilled in the art. In various specific embodiments, the separator 20 is a hydrocyclone, a membrane, a filter, or a decanting centrifuge. Each of these types of separators 20 allow for partial liquid-solid separation. In various further embodiments, the separator 20 utilizes a continuous solid recovery process such as a belt filter or rotary drum filter. Each of these types of separators 20 allow for substantially full liquid-solid separation. It will be appreciated that the specific types of separators 20 disclosed are intended as examples and are not an exhaustive listing of separators 20 which would be applicable to the system 5. Upon separation of the rich amine based sorbent liquid 111 intermixed with the encapsulated phase change material 120 into the stream of the phase change material slurry 22 and the stream of the rich amine based sorbent liquid 24, the phase change material slurry 22 may be transferred using a variety of transportation systems. In one or more embodiments, the phase change material slurry 22 is transferred with a slurry pump, such as a Lobe pump, to be recombined with the reboiler lean amine stream 38 comprising the lean amine exiting the regenerator 30. In further embodiments, the phase change material slurry 22 is transferred with a screw conveyor or belt conveyor to a holding tank (not shown) for collection of the phase change material. A dispenser connected to the holding tank may then deliver the phase change material slurry 22 in a precise fashion and a measure quantity to the reboiler lean amine stream 38.

It is noted that dispersions are generally thermodynamically unstable, but may be kinetically stable over a significant period of time. The time of stability determines the lifetime of the dispersion. To ensure consistent and repeatable heat absorption and temperature stabilization of the system 5, the encapsulated phase change material 120 and the lean amine based sorbent liquid 110 must form a stable dispersion. The absorber feed stream 100 comprising the lean amine based sorbent liquid 110 and the encapsulated phase change material 120 may become unstable if the encapsulated phase change material 120 migrates and is not evenly dispersed in the absorber feed stream 100. Migratory phenomena are mostly due to the difference in density between the continuous and dispersed phases which leads to gravitational separation of the phases. If the dispersed phase is less dense than the continuous phase, the dispersed phase migrates upwards in a phenomenon termed creaming. As such, if the encapsulated phase change material 120 has a density substantially lesser than that of the lean amine based sorbent liquid 110, the encapsulated phase change material 120 may migrate to the surface of the lean amine based sorbent liquid 110. Conversely, if the dispersed phase is more dense than the continuous phase, the dispersed phase migrates downwards in a phenomenon termed settling. As such, if the encapsulated phase change material 120 has a density substantially greater than that of the lean amine based sorbent liquid 110, the encapsulated phase change material 120 may migrate below the lean amine based sorbent liquid 110. However, instability of the dispersion of the absorber feed stream 100 is not believed to be an issue in this disclosure. Specifically, an example encapsulated phase change material 120 (sodium acetate trihydrate) has a density of approximately 1300 kilograms per cubic meter ($kg/m^3$) and an example amine based sorbent liquid 110 (water and diglycolamine) has a density of approximately 1000 $kg/m^3$ resulting in minimal risk of creaming. As such, in one or more embodiments, the encapsulated phase change material comprises a density in excess of 1000 $kg/m^3$. There is also minimal risk of settling as, using the Stoke's equation known to those skilled in the art, a velocity of $1.4 \times 10^{-6}$ meters per second (m/s) is sufficient to maintain the dispersion and the average fluid velocity in the system 5 is anticipated to be $1.4 \times 10^{-2}$ m/s.

In one or more embodiments, the ratio of the density of the encapsulated phase change material 120 to that of the lean amine based sorbent liquid 110 is between 0.25:1 and 1:1. In various further embodiments, the ratio of the density of the encapsulated phase change material 120 to that of the lean amine based sorbent liquid 110 is between 0.5:1 and 1:1, 0.75:1 and 1:1, or 0.784:1 and 0.972:1. If the mPCMs have a density range between 0.784 and 0.972, the mPCMs are believed to have sufficient buoyancy to have respectively 10% and 30% of the particles exposed to the gas phase. Having 10 to 30% of each mPCM particle exposed to the gas phase will allow the mPCMs to leave the absorber tray via a lip in an absorber 10 having trays.

In one or more embodiments, the ratio of the density of the encapsulated phase change material 120 to that of the lean amine based sorbent liquid 110 is between 1.1:1 and 2:1. If the mPCMs have a density greater than the aqueous amine solution, the liquid of this pseudo-homogenous, or partly stratified heterogeneous, mixture will leave the absorber tray via an overflow. The slurry formed from mPCMs and the amine based sorbent liquid in the lower part of the fluid will leave the absorber tray via a drain. However, while the opening of the drain is sufficiently sized to allow the mPCM slurry through, it isn't large enough to let all the liquid to go through causing the mixture to leave the absorber tray via an overflow.

EXAMPLES

An initial theoretical analysis was completed to determine the proportion of encapsulated phase change material in the absorber feed stream 100 necessary for temperature control of 1 kilogram (kg) of the absorber feed stream 100. The theoretical analysis was completed using mass balance equations (Equation 1 and Equation 2) and an energy balance equation (Equation 3). In Equation 1, Equation 2, and Equation 3, m is mass in grams (g) with $m_{water}$, $m_{Amine}$, and $m_{mPCM}$ representing mass of water, amine, and encapsulated phase change material 120 respectively, x is mass concentration of amine in water expressed as a weight percent (wt %) to form the lean amine based sorbent liquid 110, $L_{Rich}$ is loading of carbon dioxide per mole of rich amine, $L_{Lean}$ is loading of carbon dioxide per mole of lean amine, $\Delta H_{abs}$, is the enthalpy of absorption in kilojoules per mole (kJ/mol) of carbon dioxide, $M_w^{Amine}$ is the molecular weight of the amine in grams per mol (g/mol) of amine, $\Delta H_{Fusion}$ is the enthalpy of the encapsulated phase change material 120, $C_p^{mPCM}$ and $C_p^{Aq\,Sol}$ are the mass heat capacity in kilojoules per gram per degree Celsius (kJ/g-C) of the encapsulated phase change material 120 and lean amine based sorbent liquid 110 respectively, and $\Delta T$ is the temperature variation in the system in Celsius.

$$1000 = m_{water} + m_{Amine} + m_{mPCM} \quad \text{Equation 1}$$

$$\frac{m_{Amine}}{m_{Amine} + m_{water}} = x \quad \text{Equation 2}$$

$$(L_{Rich} - L_{Lean}) \times \frac{m_{Amine}}{m_w^{Amine}} \times \Delta H_{abs} = \quad \text{Equation 3}$$
$$m_{mPCM} \times [\Delta H_{Fusion} + C_p^{mPCM} \times \Delta T] +$$
$$(m_{Amine} + m_{water}) \times C_p^{Aq\ Sol} \times \Delta T$$

The theoretical analysis was completed for the case of three amines and a single encapsulated phase change material 120. Specifically, monoethanolamine (MEA), diglycolamine (DGA), and methyldiethanolamine (MDEA) were studied in combination with sodium acetate trihydrate as the encapsulated phase change material 120. The physical and chemical properties of the encapsulated phase change material 120 and the amine used in the lean amine based sorbent liquid 110 are provided in Table 5 and Table 6 respectively.

TABLE 5

Encapsulated Phase Change Material Properties

| Encapsulated Phase Change Material | Specific Gravity (g/ml) | Mass Heat Capacity (kJ/kg-C) | Enthalpy of Fusion (kJ/g) |
|---|---|---|---|
| Sodium Acetate Trihydrate | 1.3 | 3.06 at 60° C. | 0.23 |

TABLE 6

Amine Properties

| Amine | Molecular Mass (g/mol) | Enthalpy of Absorption (kJ/mol-$CO_2$) | Lean Loading (mol $CO_2$/mol Amine) |
|---|---|---|---|
| Monoethanolamine (MEA) | 61.08 | −81 | 0.1 |
| Diglycoalamine (DGA) | 105.14 | −82.7 | 0.06 |
| Methyldiethanolamine (MDEA) | 119.16 | −50.3 | 0.005 |

The temperature of the absorber feed stream 100 at the amine-based absorber 10 for the theoretical analysis ranged between 47° C. and 60° C. to represent operation in cold weather countries such as those of northern Europe and hot weather countries such as Saudi Arabia respectively. The loading of carbon dioxide in the lean amine based sorbent liquid 110 and the mass heat capacity of the rich amine based sorbent liquid 111 were determined using a process simulator. The inputs to the process simulator are provided in Table 7 for each amine at varying mass concentrations of Amine in the lean amine based sorbent liquid. The theoretical results output from the process simulator are provided in Table 8.

TABLE 7

Process Simulator Physical Inputs

| Amine | Temperature of Lean Amine Based Sorbent Liquid (° C.) | mPCM Temperature of Fusion (° C.) | Amine Mass (g) | Water Mass (g) | mPCM Mass (g) | mPCM Volume Fraction |
|---|---|---|---|---|---|---|
| 18% MEA | 47 | 60 | 159 | 723 | 118 | 9.4% |
| 18% MEA | 47 | N/A | 180 | 820 | — | — |
| Change | | | −11.8% | | | |
| 18% MEA | 47 | 47 | 129 | 587 | 285 | 23.5% |
| 18% MEA | 47 | N/A | 180 | 820 | — | — |
| Change | | | −28.5% | | | |
| 18% MEA | 60 | 60 | 134 | 609 | 257 | 21.1% |
| 18% MEA | 60 | N/A | 180 | 820 | — | — |
| Change | | | −25.7% | | | |
| 12% MEA | 47 | 47 | 94 | 686 | 220 | 17.9% |
| 12% MEA | 47 | N/A | 120 | 880 | — | — |
| Change | | | −22.0% | | | |
| 45% DGA | 47 | 47 | 312 | 381 | 307 | 25.9% |
| 45% DGA | 47 | N/A | 450 | 550 | — | — |
| Change | | | −30.7% | | | |
| 45% DGA | 47 | 60 | 376 | 459 | 165 | 13.5% |
| 45% DGA | 47 | N/A | 450 | 550 | — | — |
| Change | | | −16.5% | | | |
| 45% DGA | 60 | 60 | 314 | 384 | 302 | 25.4% |
| 45% DGA | 60 | N/A | 450 | 550 | — | — |
| Change | | | −30.2% | | | |
| 60% DGA | 47 | 60 | 437 | 291 | 272 | 23.0% |
| 60% DGA | 47 | N/A | 600 | 400 | — | — |
| Change | | | −27.2% | | | |
| 60% DGA | 47 | 47 | 367 | 244 | 389 | 33.7% |
| 60% DGA | 47 | N/A | 600 | 400 | — | — |
| Change | | | −38.9% | | | |
| 50% MDEA | 47 | 47 | 451 | 451 | 98.5 | 7.9 |
| 50% MDEA | 47 | N/A | 500 | 500 | — | — |

TABLE 7-continued

Process Simulator Physical Inputs

| Amine | Temperature of Lean Amine Based Sorbent Liquid (° C.) | mPCM Temperature of Fusion (° C.) | Amine Mass (g) | Water Mass (g) | mPCM Mass (g) | mPCM Volume Fraction |
|---|---|---|---|---|---|---|
| Change | | | −9.8% | | | |
| 50% MDEA | 60 | 60 | 470 | 470 | 60.9 | 4.8% |
| 50% MDEA | 60 | N/A | 500 | 500 | — | — |
| Change | | | −6.1% | | | |

TABLE 8

Process Simulator Outputs

| Amine | Temperature of Lean Amine Based Sorbent Liquid (° C.) | mPCM Temperature of Fusion (° C.) | Temperature of Rich Amine Based Sorbent Liquid (° C.) | $CO_2$ Loading (mol $CO_2$ per mol Amine) | $H_2S$ Loading (mol $H_2S$ per mol Amine) | Yield $CO_2$ (%) | Yield $H_2S$ (%) |
|---|---|---|---|---|---|---|---|
| 18% MEA | 47 | 60 | 60 | 0.4574 | 0.1312 | 83.5 | 68.1 |
| 18% MEA | 47 | N/A | 66 | 0.4447 | 0.1273 | 81.2 | 66.1 |
| Change | | | | 3% | 3% | 2.3% | 2.0% |
| 18% MEA | 47 | 47 | 47 | 0.4819 | 0.1404 | 88.0 | 72.9 |
| 18% MEA | 47 | N/A | 66 | 0.4447 | 0.1273 | 81.2 | 66.1 |
| Change | | | | 8% | 10% | 6.8% | 6.8% |
| 18% MEA | 60 | 60 | 60 | 0.4320 | 0.1249 | 78.9 | 64.9 |
| 18% MEA | 60 | N/A | 75 | 0.4023 | 0.1147 | 73.5 | 59.6 |
| Change | | | | 7% | 9% | 5.4% | 5.3% |
| 12% MEA | 47 | 47 | 47 | 0.5069 | 0.1572 | 85.0 | 73.9 |
| 12% MEA | 47 | N/A | 61 | 0.4757 | 0.1477 | 79.7 | 69.4 |
| Change | | | | 7% | 6% | 5.2% | 4.5% |
| 45% DGA | 47 | 47 | 47 | 0.3861 | 0.1194 | 96.0 | 81.5 |
| 45% DGA | 47 | N/A | 73 | 0.3469 | 0.0965 | 86.3 | 65.9 |
| Change | | | | 11% | 24% | 9.7% | 15.7% |
| 45% DGA | 47 | 60 | 60 | 0.3705 | 0.1087 | 92.1 | 74.2 |
| 45% DGA | 47 | N/A | 73 | 0.3469 | 0.0965 | 86.3 | 65.9 |
| Change | | | | 7% | 13% | 5.9% | 8.3% |
| 45% DGA | 60 | 60 | 60 | 0.3790 | 0.1007 | 92.6 | 76.0 |
| 45% DGA | 60 | N/A | 79 | 0.3417 | 0.0847 | 83.5 | 63.9 |
| Change | | | | 11% | 19% | 9.1% | 12.1% |
| 60% DGA | 47 | 60 | 60 | 0.3945 | 0.0892 | 91.8 | 63.1 |
| 60% DGA | 47 | N/A | 78 | 0.3652 | 0.0730 | 85.0 | 51.6 |
| Change | | | | 8% | 22% | 6.8% | 11.5% |
| 60% DGA | 47 | 47 | 47 | 0.4089 | 0.1002 | 95.2 | 71.0 |
| 60% DGA | 47 | N/A | 78 | 0.3652 | 0.0730 | 85.0 | 51.6 |
| Change | | | | 12% | 37% | 10.2% | 19.3% |
| 50% MDEA | 47 | 47 | 47 | 0.2174 | 0.1122 | 61.5 | 75.1 |
| 50% MDEA | 47 | N/A | 58 | 0.1792 | 0.1043 | 50.7 | 69.8 |
| Change | | | | 21% | 8% | 10.8% | 5.2% |
| 50% MDEA | 60 | 60 | 60 | 0.1691 | 0.1026 | 47.8 | 68.6 |
| 50% MDEA | 60 | N/A | 65 | 0.1508 | 0.0985 | 42.7 | 65.9 |
| Change | | | | 12% | 4% | 5.2% | 2.8% |

Table 7 and Table 8 indicate that the temperature of 1 kilogram of lean amine based sorbent liquid 110 may be controlled and maintained using approximately 6.9 to 30.2 wt % of the encapsulated phase change material 120 in combination with the lean amine based sorbent liquid 110. Additionally, an unexpected increase in the $CO_2$ and $H_2S$ loading capabilities of the lean amine based sorbent liquid 110 in conversion to the rich amine based sorbent liquid 111 is demonstrated. Specifically, the loading of $CO_2$ increased from 3 to 21 percent with the inclusion of the encapsulated phase change material 120 for various amines and the loading of $H_2S$ increased from 3 to 37 percent with the inclusion of the encapsulated phase change material 120 for various amines. The inclusion of the encapsulated phase change material 120 for various amines also resulted in an unexpected increase in absorption performance of the lean amine based sorbent liquid 110. Specifically, the yield of $CO_2$ removed from the fed sour gas stream increased by 2.3 to 10.8 percent and the yield of $H_2S$ removed from the fed sour gas stream increased by 2.0 to 19.3 percent. Increases in the acid gas loading in the lean amine based sorbent liquid 110 and increases in yield of acid gases removes results in a cleaner exhaust gas stream as well as allows for potentially processing larger amounts of acid gas or a reduction in the size of the system required.

The selectivity between removal of $CO_2$ and $H_2S$ was also evaluated. With reference to FIGS. 4 and 5 it may be seen that as the temperature increased the loading capacity of $CO_2$ and $H_2S$ into the amine based sorbent liquid decreases. The difference between the loading capacity at low temperature such as the temperature at the exit of the absorber 30 and the loading capacity at the reboiler temperature provides a measurement of how much of the $CO_2$ and $H_2S$ would actually be removed from the sour gas stream. This measure may be referred to as the total loading capacity As the temperature of the amine based sorbent liquid changes the absorption of CO2 and $H_2S$ change at different rates. Thus, the temperature of the amine based sorbent liquid may be adjusted to change the selectivity between absorption of CO2 and $H_2S$. It may be desirable to separate hydrogen sulfide from carbon dioxide as the Clauss process which transforms hydrogen sulfide into solid sulfur works best with low level of carbon dioxide of less than 10%. To achieve this, an amine based sorbent liquid more selective to $H_2S$ may be used.

A greater selectivity toward $H_2S$ combined with a greater total loading capacity means greater removal of $H_2S$ and a greater overall acid gases removal from the sour gas. This allows sale gas with a minimum high heating value of 930 BTU/SCF and a maximum hydrogen sulfide concentration of 15.7 ppm by volume to be produced with a reduced number of total absorbers. Specifically, increased $H_2S$ removal and increased total acid gas removal combined may allow a gas plant which previously operated with 10 DGA Amine processes to process the full amount of the sour gas desired with only 7 DGA Amine processes with the addition of mPCMs.

The theoretical analysis was validated with a physical experimental analysis as well. The experimental validation consisted of utilizing two different amine based solutions to absorb $CO_2$ and performing a comparative analysis of their respective thermal responses. A first solution comprising a lean amine based sorbent liquid and an encapsulated phase change material was prepared as Example 1. Example 1 comprised a solution of 9% MEA, 29% encapsulated phase change material, and 62% water by volume. The particular encapsulated phase change material utilized was PCM28 from MikroCaps (Ljubljana, Slovenia). PCM28 comprises paraffin wax as a phase change material and melamine-formaldehyde as the encapsulation membrane around the phase change material. PCM28 is provided as an encapsulated phase change material in a water solution. The physical properties of PCM28 are provided in Table 9.

TABLE 9

| MikroCaps PCM28 Physical Properties | |
|---|---|
| Phase Change Material content in slurry | 34-35 wt % |
| Phase Change Material in dry capsule | 82-86 wt % |
| Dry content in the dispersion | 39-41 wt % |
| Phase Change Material Melting Range | 25° C.-30° C. |
| Heat Storage Capacity | 190-210 J/g |
| pH | 7.0-9.0 |
| Density | 900-970 g/l |
| Viscosity | 100-500 cPs |
| Visual Appearance | Off-white slurry |
| Average Particle Size | 10-30 microns |

A second solution omitting the encapsulated phase change material of Example 1 was prepared as Comparative Example 2. Comparative Example 2 comprised 9% MEA and 91% water by volume.

Each of Example 1 and Comparative Example 2 were tested by continuously injecting carbon dioxide gas through a glass sparger at the bottom of a gas dispersion tube. The gas dispersion tube contained either the solution of Example 1 or the solution of Comparative Example 2. The carbon dioxide gas was supplied in excess to maximize usage of amines present in Example 1 and Comparative Example 2 and therefore also maximize heat generation.

The temperature of the solution (Example 1 or Comparative Example 2) in the gas dispersion tube was recorded with an infrared camera (FLIR, model GF-320). The infrared camera was position at a distance of 30 centimeters (cm) from the gas dispersion tube in conformity with manufacturer recommendation for the infrared camera utilized. Infrared pictures were captured at 5 second (s) intervals. The flow of carbon dioxide and picture capture were terminated when the temperature of the solution reached a plateau or began to decrease. FIG. 7 provides a graphical representation of the temperature increase with respect to time for Example 1 and Comparative Example 2. It may be visualized in FIG. 7 that Example 1 maintains a temperature below 28° C. with the inclusion of the encapsulated phase change material where Comparative Example 2 has a temperature rise in excess of 28° C.

With reference to FIG. 7, both Example 1 and Comparative Example 2 exhibit similar temperature rise for the first 10 seconds of $CO_2$ introduction. After 10 seconds, the temperature curves diverge where Comparative Example 2 which does not contain any encapsulated phase change material continues to absorb $CO_2$ until approximately 25 seconds with a commensurate continued temperature increase. Subsequently, the temperature begins to decrease as the reaction between Comparative Example 2 and the $CO_2$ arrives to completion. Specifically, the MEA in Comparative Example 2 becomes fully saturated with $CO_2$ and the reaction terminates. Conversely, Example 1 which contains 23% by volume of PCM28 presents a quasi-plateau in the temperature profile as temperature rises into the melting temperature of PCM28 (25-30° C.). Specifically, from approximately 15 seconds onwards, the temperature rise is limited to approximately 27.5° C. and is indicative of the encapsulated phase change material melting and storing heat generated from the $CO_2$ absorption. As a result, Example 1 maintains a cooler final temperature than comparative Example 2.

The lower temperature of Example 1 than Comparative Example 2 additionally allows for an increased loading of carbon dioxide into the solution of Example 1. In operation in the system 5 this translates to not only maintaining a reduced temperature in the amine-based absorber 10, but also increasing loading of acid gas into the lean amine based sorbent liquid 110 which intrinsically improves the absorption performance. A vapor-liquid equilibrium curve for carbon dioxide in an aqueous amine solution illustrates an increase in loading for a given partial pressure of carbon dioxide as the temperature of the aqueous amine solution is decreased. The increase in overall loading and absorption performance allows for a decrease in the amount of amine employed to remove the same acid gas concentration from a sour gas feed.

A reduction in operating temperature of the amine-based absorber 10 with the lean amine based sorbent liquid 110 maintained at a lower temperature during operation also corresponds to a decrease in the corrosion of the system 5. Corrosion of the system 5 is decreased as many corrosive attributes are temperature sensitive with more corrosion at an elevated temperature.

Reducing the operating temperature of the amine-based absorber 10 with the lean amine based sorbent liquid 110 maintained at a lower temperature during operation also corresponds to a reduction in the amount of amine lost in the outgoing sweet gas stream. Evaporation of amines increases as temperature is increased at a consistent pressure resulting in the loss of amines which could have been used for further absorption of acid gases. Additionally, lost amines as a result of evaporation have to be replenished in the system 5 leading to increased process complexity and expense.

It should now be understood the various aspects of the method of removing acid gas from a sour gas system and system for use in the same are described and such aspects may be utilized in conjunction with various other aspects.

In a first aspect, the disclosure provides a method of removing acid gas from a sour gas stream. The method comprises providing a lean amine based sorbent liquid, wherein the lean amine based sorbent liquid is an amine based sorbent liquid configured to absorb the acid gas from the sour gas stream, providing an encapsulated phase change material, wherein the encapsulated phase change material is a phase change material which changes phase from solid to liquid upon heating encapsulated in a polymeric or inorganic shell with a melting point in excess of the melting point of the phase change material, (1) passing the sour gas stream in a counter-flow arrangement with the lean amine based sorbent liquid and the encapsulated phase change material in an absorber, wherein the lean amine based sorbent liquid absorbs the acid gas from the sour gas stream to form a rich amine based sorbent liquid and the encapsulated phase change material absorbs at least a portion of the energy freed by the heat of reaction from the conversion from the lean amine based sorbent liquid to the rich amine based sorbent liquid, (2) separating the rich amine based sorbent liquid and the encapsulated phase change material to generate a rich amine based sorbent liquid stream and an encapsulated phase change material slurry. (3) passing the rich amine based sorbent liquid stream to an amine regenerator wherein the rich amine based sorbent liquid is heated to release the absorbed sour gas and regenerate the lean amine based sorbent liquid. (4) passing the encapsulated phase change material slurry separated from the rich amine based sorbent liquid and the lean amine based sorbent liquid from the amine regenerator through a cooler to reduce the temperature of the encapsulated phase change material and the lean amine based sorbent liquid such that the phase change material in the encapsulated phase change material solidifies, and (5) repeating steps 1 through 4 with the cooled encapsulated phase change material and the lean amine based sorbent liquid from step (4).

In a second aspect, the disclosure provides the method of the first aspect, in which the phase change material comprises a heat of fusion of 40 to 100° C.

In a third aspect, the disclosure provides the method of the first aspect, in which the phase change material comprises a heat of fusion of 55° C. to 65° C.

In a fourth aspect, the disclosure provides the method of the first aspect, in which the phase change material comprises a heat of fusion of 75° C. to 85° C.

In a fifth aspect, the disclosure provides the method of any of the first through fourth aspects, in which the method further comprises recovering heat from the encapsulated phase change material separated from the rich amine based sorbent liquid.

In a sixth aspect, the disclosure provides the method of the fifth aspect, in which the recovered heat is utilized to generate electricity.

In a seventh aspect, the disclosure provides the method of any of the first through sixth aspects, in which wherein the regenerator includes an amine regenerator reboiler at the bottom of a column forming the amine regenerator and the recovered heat is transferred from the encapsulated phase change material to the rich amine based sorbent liquid at an inlet to the amine regenerator reboiler.

In an eighth aspect, the disclosure provides the method of any of the first through seventh aspects, in which the encapsulated phase change material slurry comprises less than 20 volume percent residual rich amine based sorbent liquid.

In a ninth aspect, the disclosure provides the method of any of the first through eighth aspects, in which the ratio of the density of the encapsulated phase change material to that of the lean amine based sorbent liquid is between 0.25:1 and 1:1.

In a tenth aspect, the disclosure provides the method of any of the first through ninth aspects, in which a temperature rise of the lean amine based sorbent liquid in the absorber is less than 15° C.

In an eleventh aspect, the disclosure provides the method of any of the first through tenth aspects, in which the temperature of the rich amine based sorbent liquid exiting the absorber is maintained at or below 85° C.

In a twelfth aspect, the disclosure provides the method of any of the first through eleventh aspects, in which the encapsulated phase change material has an average diameter between 10 and 10,000 microns.

In a thirteenth aspect, the disclosure provides a system for use in removing acid gas from a sour gas stream in a continuous flow process. The system comprises an amine-based absorber comprising a sour gas inlet, a lean amine based sorbent liquid inlet, a sweet gas outlet, and a rich amine based sorbent liquid outlet, a separator having an inlet fluidly connected to the amine-based absorber at the rich amine based sorbent liquid outlet, an amine regenerator fluidly connected to the separator, and a cooler fluidly connected to the separator and the amine regenerator. A lean amine based sorbent liquid configured to absorb the acid gas from the sour gas stream and an encapsulated phase change material are provided to the amine-based absorber at the lean amine based sorbent liquid inlet, wherein the encapsulated phase change material is a material which changes phase from solid to liquid upon heating encapsulated in a polymeric or inorganic shell with a melting point in excess of the melting point of the phase change material. The sour gas is provided as the sour gas stream to the amine-based absorber at the sour gas inlet. The sour gas stream is passed in a counter-flow arrangement with the lean amine based sorbent liquid and the encapsulated phase change material in the amine-based absorber such that the lean amine based sorbent liquid absorbs the acid gas from the sour gas stream to form a rich amine based sorbent liquid and the encapsulated phase change material absorbs at least a portion of the energy freed by the heat of reaction from the conversion from the lean amine based sorbent liquid to the rich amine based sorbent liquid. The sour gas stream with the acid gas is removed to form a sweet gas stream is vented from the amine based absorber at the sweet gas outlet. The rich amine based sorbent liquid with the absorbed acid gas and the encapsulated phase change material is muted from the rich amine based sorbent liquid outlet of the amine-based absorber to the separator. The separator is configured to separate the rich amine based sorbent liquid and the encapsulated phase change material to generate a rich amine based sorbent liquid stream and an encapsulated phase change material slurry with the rich amine based sorbent liquid routed to the amine regenerator and the encapsulated phase change material slurry routed to the cooler. The amine regenerator removes the acid gas from the rich amine based sorbent liquid to regenerate the lean amine based sorbent liquid. The lean amine based sorbent liquid from the amine regenerator is recombined with the encapsulated phase change material slurry from the separator before passage through the cooler to reduce the temperature of the encapsulated phase change material and the lean amine based sorbent liquid such that the phase change material in the encapsulated phase change material solidifies. Finally, the encapsulated phase change material and the lean amine based sorbent liquid from the cooler are routed back to the amine-based absorber and fed through the lean amine based sorbent liquid inlet.

In a fourteenth aspect, the disclosure provides the system of the thirteenth aspect, in which the amine-based absorber further comprises a column with a gas distributing space proximal the sour gas inlet and a liquid distributor proximal the lean amine based sorbent liquid inlet with contactors disposed between the liquid distributor and the gas distributing space.

In a fifteenth aspect, the disclosure provides the system of the fourteenth aspect, in which the contactor is tower packing.

In a sixteenth aspect, the disclosure provides the system of the fourteenth aspect, in which the contactor is a plurality of contactor trays.

In a seventeenth aspect, the disclosure provides the system of the thirteenth aspect, in which the amine-based absorber comprises a membrane contactor with the encapsulated phase change material and the lean amine based sorbent liquid passed on one side of a membrane and the sour gas stream passed through the amine-based absorber on the other side of the membrane allowing transfer of acid gases from the sour gas stream to the lean amine based sorbent liquid through the membrane.

In an eighteenth aspect, the disclosure provides the system of any of the thirteenth through seventeenth aspects, in which the phase change material comprises a heat of fusion of 40 to 100° C.

In a nineteenth aspect, the disclosure provides the system of any of the thirteenth through seventeenth aspects, in which the phase change material comprises a heat of fusion of 55° C. to 65° C.

In a twentieth aspect, the disclosure provides the system of any of the thirteenth through seventeenth aspects, in which the phase change material comprises a heat of fusion of 75° C. to 85° C.

In a twenty-first aspect, the disclosure provides the system of any of the thirteenth through twentieth aspects, in which the system further comprises a heat recovery mechanism for recovering heat from the encapsulated phase change material separated from the rich amine based sorbent liquid.

In a twenty-second aspect, the disclosure provides the system of the twenty-first aspect, in which the recovered heat is utilized to generate electricity.

In a twenty-third aspect, the disclosure provides the system of any of the thirteenth through twenty-second aspects, in which the regenerator includes an amine regenerator reboiler at the bottom of a column forming the amine regenerator and the recovered heat is transferred from the encapsulated phase change material to the rich amine based sorbent liquid at an inlet to the amine regenerator reboiler.

In a twenty-fourth aspect, the disclosure provides the system of any of the thirteenth through twenty-third aspects, in which the encapsulated phase change material slurry comprises less than 20 volume percent residual rich amine based sorbent liquid.

In a twenty-fifth aspect, the disclosure provides the system of any of the thirteenth through twenty-fourth aspects, in which the ratio of the density of the encapsulated phase change material to that of the lean amine based sorbent liquid is between 0.25:1 and 1:1

In a twenty-sixth aspect, the disclosure provides the system of any of the thirteenth through twenty-fourth aspects, in which the ratio of the density of the encapsulated phase change material to that of the lean amine based sorbent liquid is between 1.1:1 and 2:1.

In a twenty-seventh aspect, the disclosure provides the system of any of the thirteenth through twenty-sixth aspects, in which a temperature rise of the lean amine based sorbent liquid in the absorber is less than 15'C.

In a twenty-eighth aspect, the disclosure provides the system of any of the thirteenth through twenty-seventh aspects, in which the temperature of the rich amine based sorbent liquid exiting the absorber is maintained at or below 85° C.

In a twenty-ninth aspect, the disclosure provides the system of any of the thirteenth through twenty-eighth aspects, in which the encapsulated phase change material has an average diameter between 10 and 10,000 microns.

In a thirtieth aspect, the disclosure provides the method of any of the first through eighth aspects, in which the ratio of the density of the encapsulated phase change material to that of the lean amine based sorbent liquid is between 1.1:1 and 2:1

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of removing acid gas from a sour gas stream, the method comprising:
   providing a lean amine based sorbent liquid, wherein the lean amine based sorbent liquid is an amine based sorbent liquid configured to absorb the acid gas from the sour gas stream;
   providing an encapsulated phase change material, wherein the encapsulated phase change material is a phase change material which changes phase from solid to liquid upon heating encapsulated in a polymeric or inorganic shell with a melting point in excess of the melting point of the phase change material;
   (1) passing the sour gas stream in a counter-flow arrangement with the lean amine based sorbent liquid and the encapsulated phase change material in an absorber, wherein the lean amine based sorbent liquid absorbs the acid gas from the sour gas stream to form a rich amine based sorbent liquid and the encapsulated phase change material absorbs at least a portion of the energy freed by the heat of reaction from the conversion from the lean amine based sorbent liquid to the rich amine based sorbent liquid;

(2) separating the rich amine based sorbent liquid and the encapsulated phase change material to generate a rich amine based sorbent liquid stream and an encapsulated phase change material slurry;
(3) passing the rich amine based sorbent liquid stream to an amine regenerator wherein the rich amine based sorbent liquid is heated to release the acid gas absorbed from the sour gas stream and regenerate the lean amine based sorbent liquid;
(4) passing the encapsulated phase change material slurry separated from the rich amine based sorbent liquid and the lean amine based sorbent liquid from the amine regenerator through a cooler to reduce the temperature of the encapsulated phase change material and the lean amine based sorbent liquid such that the phase change material in the encapsulated phase change material solidifies; and
(5) repeating steps 1 through 4 with the cooled encapsulated phase change material and the lean amine based sorbent liquid from step (4).

2. The method of claim 1, wherein the phase change material comprises a heat of fusion of 40 to 100° C.

3. The method of claim 1, wherein the method further comprises recovering heat from the encapsulated phase change material separated from the rich amine based sorbent liquid.

4. The method of claim 3, wherein the recovered heat is utilized to generate electricity.

5. The method of claim 1, wherein the regenerator includes an amine regenerator reboiler at the bottom of a column forming the amine regenerator and the recovered heat is transferred from the encapsulated phase change material to the rich amine based sorbent liquid at an inlet to the amine regenerator reboiler.

6. The method of claim 1, wherein the encapsulated phase change material slurry comprises less than 20 volume percent residual rich amine based sorbent liquid.

7. The method of claim 1, wherein the ratio of the density of the encapsulated phase change material to that of the lean amine based sorbent liquid is between 0.25:1 and 2:1.

8. The method of claim 1, wherein a temperature rise of the lean amine based sorbent liquid in the absorber is less than 15° C.

9. The method of claim 1, wherein the temperature of the rich amine based sorbent liquid exiting the absorber is maintained at or below 85° C.

10. The method of claim 1, wherein the encapsulated phase change material has an average diameter between 10 and 10,000 micrometers.

* * * * *